United States Patent
Papangelis et al.

(10) Patent No.: US 10,446,148 B2
(45) Date of Patent: Oct. 15, 2019

(54) DIALOGUE SYSTEM, A DIALOGUE METHOD AND A METHOD OF ADAPTING A DIALOGUE SYSTEM

(71) Applicant: Kabushiki Kaisha Toshiba, Minato-ku (JP)

(72) Inventors: Alexandros Papangelis, Cambridge (GB); Ioannis Stylianou, Cambridge (GB)

(73) Assignee: Kabushiki Kaisha Toshiba, Minato-ku (JP)

( * ) Notice: Subject to any disclaimer, the term of this patent is extended or adjusted under 35 U.S.C. 154(b) by 0 days.

(21) Appl. No.: 15/687,793

(22) Filed: Aug. 28, 2017

(65) Prior Publication Data

US 2018/0233143 A1 Aug. 16, 2018

(30) Foreign Application Priority Data

Feb. 13, 2017 (GB) .................................. 1702343.3

(51) Int. Cl.
*G10L 15/22* (2006.01)
*G10L 15/16* (2006.01)
(Continued)

(52) U.S. Cl.
CPC .......... *G10L 15/22* (2013.01); *G06F 16/3329* (2019.01); *G06F 17/27* (2013.01); *G10L 15/063* (2013.01); *G10L 15/16* (2013.01)

(58) Field of Classification Search
CPC ..... G06F 9/4448; G10L 15/265; G10L 15/22; G10L 15/00
See application file for complete search history.

(56) References Cited

U.S. PATENT DOCUMENTS 6,983,252 B2 * 1/2006 Matheson ............... G06F 9/451
704/275
8,010,474 B1 * 8/2011 Bill .......................... A63F 13/12
706/46

(Continued)

FOREIGN PATENT DOCUMENTS

GB 2537903 A 11/2016

OTHER PUBLICATIONS

M. Gasic et al., Distributed Dialogue Policies for Multi-Domain Statistic AL Dialogue Management, IEEE, ICASSP. (Year: 2015).*

(Continued)

*Primary Examiner* — Anne L Thomas-Homescu
(74) *Attorney, Agent, or Firm* — Oblon, McClelland, Maier & Neustadt, L.L.P.

(57) ABSTRACT

A dialog system comprising:
an input for receiving data relating to a speech or text signal originating from a user;
an output for outputting information specified by an action; and
a processor configured to:
update one or more system states based on the input data using one or more state tracker models, wherein the one or more system states comprise probability values associated with each of a plurality of possible values for each of a plurality of categories, wherein a category corresponds to a subject that the speech or text signal may relate to and can take on one or more values from a set of values;
determine an action function and determine an action function input by inputting information generated using the system state and a set of stored information into a policy model, the set of stored information comprising a plurality of action functions;

(Continued)

output information specified by the determined action function and the determined action function input at the output.

5 Claims, 13 Drawing Sheets

(51) Int. Cl.
    *G06F 17/27*     (2006.01)
    *G06F 16/332*     (2019.01)
    *G10L 15/06*     (2013.01)

(56) References Cited

U.S. PATENT DOCUMENTS

| | | | |
|---|---|---|---|
| 9,318,109 B2* | 4/2016 | Boies | G10L 15/1815 |
| 2006/0271364 A1* | 11/2006 | Mirkovic | G06F 17/28 704/239 |
| 2007/0078815 A1* | 4/2007 | Weng | G06F 17/30401 |
| 2010/0131274 A1* | 5/2010 | Stent | G10L 15/183 704/257 |
| 2011/0010164 A1 | 1/2011 | Williams | |
| 2012/0053945 A1 | 3/2012 | Gupta et al. | |
| 2014/0279764 A1* | 9/2014 | Lahr | G06F 9/5038 706/12 |
| 2014/0361973 A1* | 12/2014 | Raux | G06F 3/167 345/156 |
| 2015/0095033 A1* | 4/2015 | Boies | G10L 15/1815 704/257 |
| 2015/0363393 A1* | 12/2015 | Williams | G06F 17/289 704/8 |
| 2016/0322050 A1* | 11/2016 | Wang | G10L 15/22 |
| 2016/0378173 A1* | 12/2016 | Mulla | G06F 1/3296 713/323 |
| 2017/0091171 A1* | 3/2017 | Perez | G10L 15/22 |
| 2018/0046619 A1* | 2/2018 | Shi | G06F 17/2836 |
| 2018/0060301 A1* | 3/2018 | Li | G06F 17/2775 |
| 2018/0114528 A1* | 4/2018 | Yasavur | G06F 17/279 |
| 2018/0121415 A1* | 5/2018 | Perez | G06F 17/279 |

OTHER PUBLICATIONS

B. Thomson et al., Bayesian update of dialogue state: A POMDP framework for spoken dialogue systems, Elsevier Compluter Speech and Language. (Year: 2009).*

Combined Office Action and Search Report dated Oct. 9, 2017 in United Kingdom Patent Application No. GB1702343.3.

Iñigo Casanueva, et al., "Knowledge transfer between speakers for personalised dialogue management" 16th Annual Meeting of the Special Interest Group on Discourse and Dialogue, 2015, pp. 12-21.

Senthilkumar Chandramohan, et al., "Co-adaptation in Spoken Dialogue Systems" Natural Interaction with Robots, Knowbots and Smartphones, 2014, pp. 1-11.

M. Gašić, et al., "Distributed Dialogue Policies for Multi-Domain Statistical Dialogue Management" Acoustics, Speech and Signal Processing (ICASSP), 2015 IEEE International Conference on. IEEE, 2015, pp. 5371-5375.

M. Gašić, et al., "Policy Committee for Adaptation in Multi-Domain Spoken Dialogue Systems" 2015 IEEE Workshop on Automatic Speech Recognition and Understanding (ASRU). IEEE, 2015, pp. 806-812.

Alexandros Papangelis, et al., "Multi-Domain Spoken Dialogue Systems using Domain-Independent Parameterization" Domain Adaptation for Dialogue Agents Workshop of the 26th European Conference on Machine Learning, Sep. 2016, 8 pages.

Oliver Lemon, et al., "Evaluating Effectiveness and Portability of Reinforcement Learned Dialogue Strategies with Real Users: The Talk Towninfo Evaluation" 2006 IEEE Spoken Language Technology Workshop, 2006, pp. 178-181.

Anna Margolis, et al., "Domain Adaptation with Unlabeled Data for Dialog Act Tagging" Proceedings of the 2010 Workshop on Domain Adaptation for Natural Language Processing. Association for Computational Linguistics, 2010, 67 pages.

Zhuoran Wang, et al., "Learning Domain-Independent Dialogue Policies via Ontology Parameterisation" 16th Annual Meeting of the Special Interest Group on Discourse and Dialogue, 2015, pp. 412-416.

Matthew E. Taylor, et al., "Transfer Learning for Reinforcement Learning Domains: A Survey" Journal of Machine Learning Research, vol. 10, No. Jul. 2009, pp. 1633-1685.

Gokhan Tur, et al., "Model Adaptation for Dialog Act Tagging" 2006 IEEE Spoken Language Technology Workshop, 2006, pp. 94-97.

Marilyn Walker, et al., "Individual and Domain Adaptation in Sentence Planning for Dialogue" Journal of Artificial Intelligence Research, vol. 30, 2007, pp. 413-456.

Matthew Henderson, et al., "Word-Based Dialog State Tracking with Recurrent Neural Networks" Proceedings of the 15th Annual Meeting of the Special Interest Group on Discourse and Dialogue (SIGDIAL), 2014, 8 pages.

Heriberto Cuayáhuitl, et al., "Deep Reinforcement Learning for Multi-Domain Dialogue Systems" NIPS Workshop on Deep Reinforcement Learning, 2016, 9 pages.

Steve Young, et al., "The Hidden Information State Model: A Practical Framework for POMDP-Based Spoken Dialogue Management" Computer Speech & Language, vol. 24, No. 2, 2010, 40 pages.

Su Zhu, et al., "Semantic Parser Enhancement for Dialogue Domain Extension with Little Data" Spoken Language Technology Workshop (SLT), 2014, 6 pages.

Volodymyr Mnih, et al., "Human-level control through deep reinforcement learning" Nature, vol. 518, No. 7540, 2015, 13 pages.

Tiancheng Zhao, et al., "Towards End-to-End Learning for Dialog State Tracking and Management using Deep Reinforcement Learning" arXiv preprint arXiv:1606.02560, 2016, 10 pages.

Sungjin Lee, et al., "Task Lineages: Dialog State Tracking for Flexible Interaction" 17th Annual Meeting of the Special Interest Group on Discourse and Dialogue, 2016, pp. 11-21.

* cited by examiner

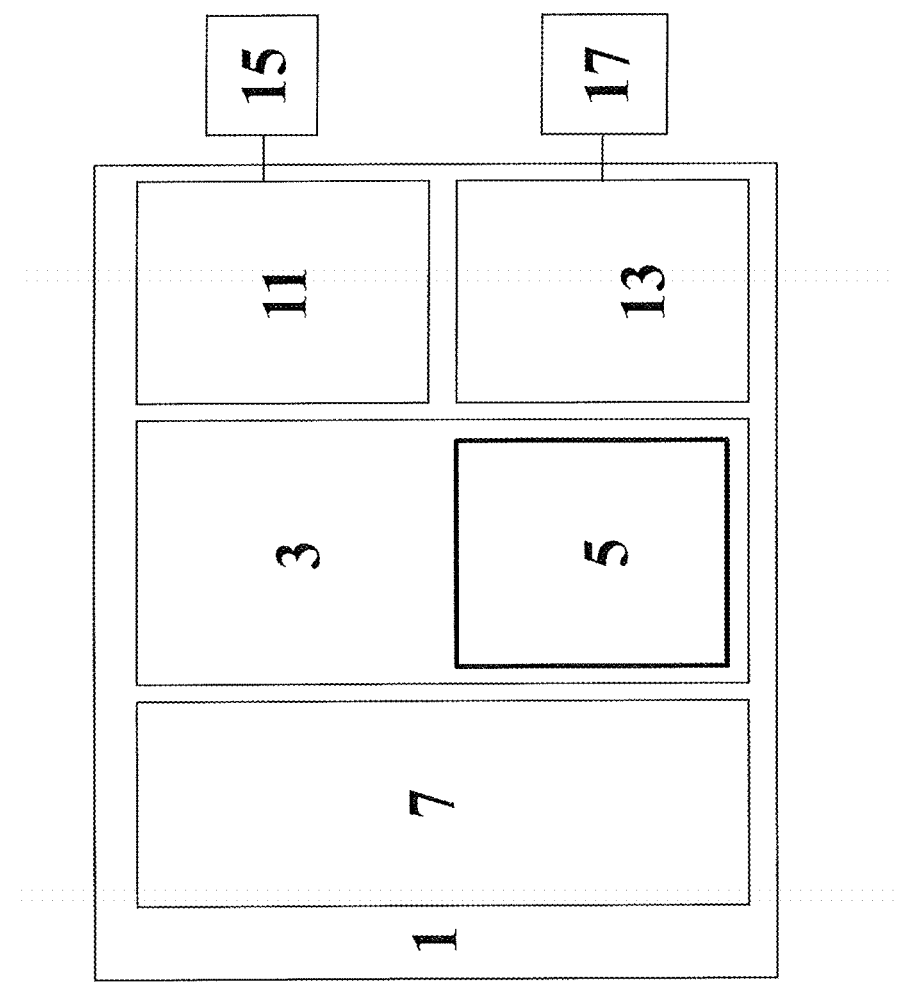

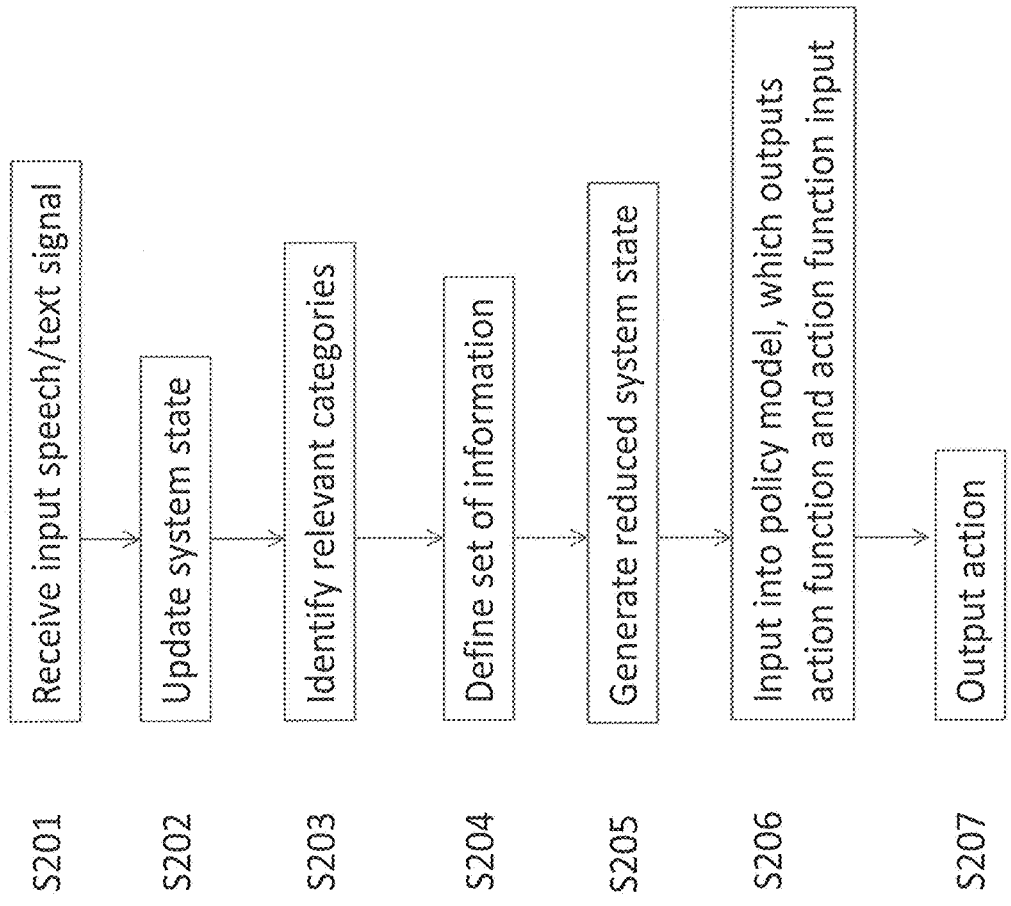

DIALOGUE SYSTEM, A DIALOGUE METHOD AND A METHOD OF ADAPTING A DIALOGUE SYSTEM

CROSS-REFERENCE TO RELATED APPLICATIONS

This application is based upon and claims the benefit of priority from prior United Kingdom Application number 1702343.3 filed on Feb. 13, 2017, the entire contents of which are incorporated herein by reference.

FIELD

The present disclosure relates to a dialogue system, a dialogue method and a method of adapting a dialogue system.

BACKGROUND

Dialogue systems, for example spoken dialogue systems (SDSs) are used in many applications, including automated call centres, assistive technology, speech-driven or text-driven interactive mobile applications, speech or text interface for wearable devices and human-robot interactions for example, and are intended to interact with humans, for example to verbally interact with humans.

Dialogue systems may use pre-defined domain-specific ontologies and a policy model trained to work in the specific pre-defined domain. Multi-domain dialogue systems may switch between pre-defined domain ontologies and corresponding dialogue policies, using topic trackers to identify the pre-defined domain that most closely matches the input.

There is a continuing need to make dialogue systems operable across multiple domains, whilst reducing the training, maintenance and human design input needed for such systems.

BRIEF DESCRIPTION OF THE DRAWINGS

Systems and methods in accordance with non-limiting arrangements will now be described with reference to the accompanying figures in which:

FIG. 1(b) is an overview of an example SDS architecture;

FIG. 2 is a flow chart showing an example method performed by a dialogue system;

DETAILED DESCRIPTION

Figure 1A:
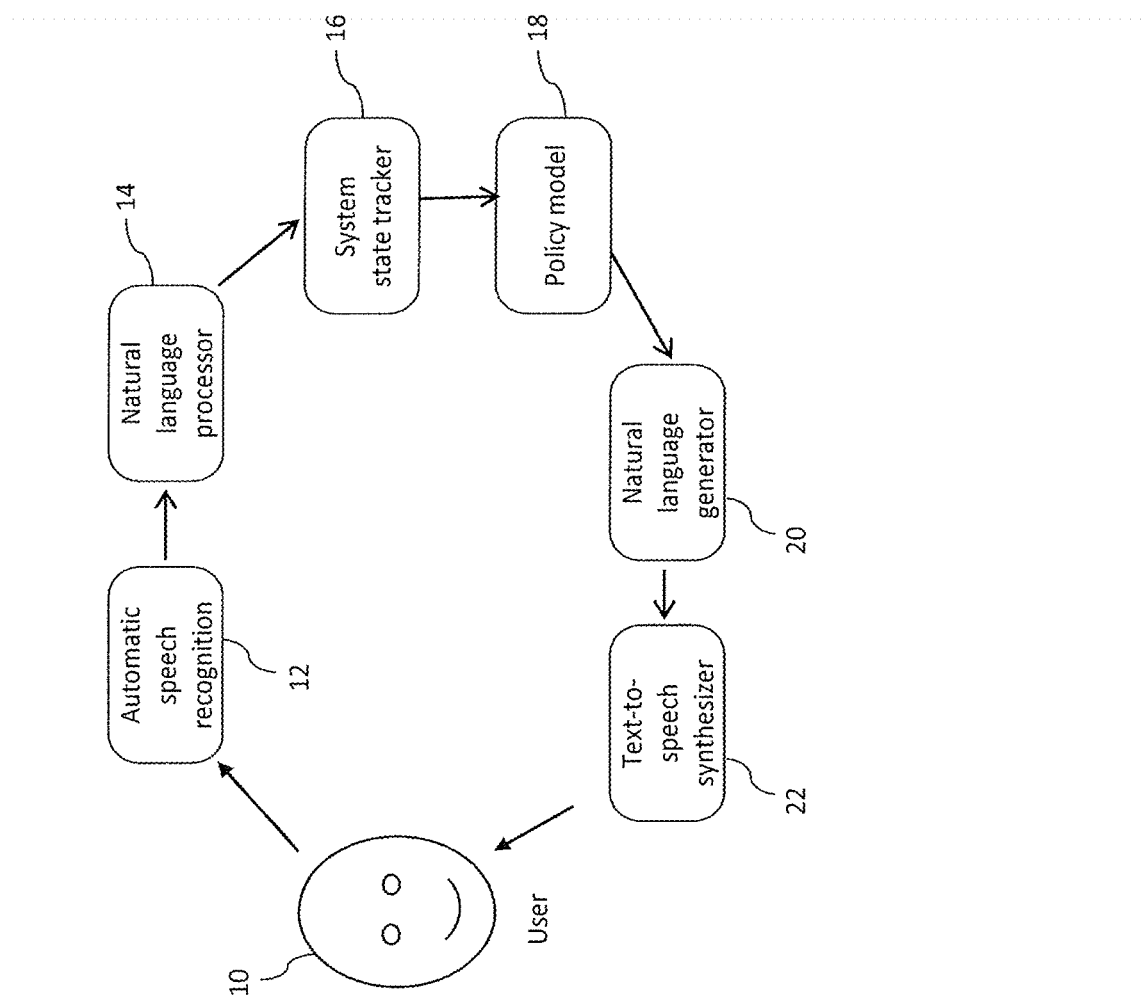
FIG. 1(a) is a schematic illustration of a spoken dialogue system.

There is provided a dialogue system comprising:
an input for receiving data relating to a speech or text signal originating from a user;
an output for outputting information specified by an action; and
a processor configured to:
update one or more system states based on the input data using one or more state tracker models, wherein the one or more system states comprise probability values associated with each of a plurality of possible values for each of a plurality of categories, wherein a category corresponds to a subject that the speech or text signal may relate to and can take on one or more values from a set of values;
determine an action function and determine an action function input by inputting information generated using the system state and a set of stored information into a policy model, the set of stored information comprising a plurality of action functions;
output information specified by the determined action function and the determined action function input at the output.

The plurality of categories are from a plurality of different pre-defined domain-specific ontologies, wherein a pre-defined domain corresponds to a particular dialogue topic and wherein the pre-defined domain-specific ontology comprises the plurality of categories relating to the particular dialogue topic, and wherein the plurality of action functions are domain independent.

The plurality of action functions may comprise one or more of: greet, goodbye, inform, confirm, select, request, request more, and repeat.

The inputted information generated using the system state or the set of stored information comprises a set of possible action function inputs. The action function inputs may comprise categories. Each action function input may be a category.

Optionally, determining an action function and determining an action function input comprises:
for each possible action function input generating a vector of values, wherein each value in each vector corresponds to an action function and is an estimate of the dialogue performance if the action function and action function input are used to generate the output information, the values being generated from stored parameters;
wherein the determined action function and action function input corresponds to the action function corresponding to the highest value from all of the vectors.

The policy model may comprise a neural network. Optionally, determining an action function and determining an action function input comprises inputting each possible action function input into the neural network, together with the system state, in turn. The neural network is configured to generate a vector of values for each input, wherein each value in each vector corresponds to an action function and is an estimate of the dialogue performance if the action function and the action function input are used to generate the output information. The neural network outputs the action function corresponding to the highest value for each vector. The determined action function and action function input correspond to the action function corresponding to the highest value from all of the vectors.

The neural network may be configured to operate with ontology-independent parameters and the processor is further configured to:
  parameterize the information generated using the system state in terms of a first set of one or more ontology independent parameters;
  parameterize each action function input inputted to the neural network.

Each action function input is parameterised and the parameters used to generate the vector of values for the action function input, wherein each vector of values corresponds to a domain specific action function input.

The system input may be for receiving a speech signal and wherein the output is an output for outputting a speech signal and wherein the processor is further configured to:
  generate an automatic speech recognition hypothesis with associated probability from the input speech signal
  generate text based on the action;
  convert the text to speech to be output.

Where the action function inputs comprise categories, the processor may be further configured to:
  identify one or more relevant categories;
  generate a reduced system state, comprising the probability values associated with one or more of the plurality of possible values for each of the relevant categories, wherein at least part of the reduced system state is inputted into the model.

Where the action function inputs comprise categories, the processor may be further configured to:
  identify one or more relevant categories;
  exclude categories which are not identified as relevant from the system state and action function inputs inputted into the neural network.

Where the action function inputs are comprised in the set of stored information, the set of stored information excludes categories which are not relevant.

Where the action function inputs are comprised in the information generated using the updated system state, the action function inputs are taken from the reduced system state. The reduced system state is also inputted into the policy model. It may be parameterised before being inputted.

Identifying one or more relevant categories may comprise inputting at least part of the updated system state information into an identifier model, which obtains a probability that each category is relevant based on the updated system state and identifies the relevant categories as those with probabilities higher than a threshold value, wherein the relevant categories comprise categories from different pre-defined domain-specific ontologies and wherein the reduced system state does not comprise probability values associated with any of the plurality of possible values for any of the categories which were not identified as relevant.

Identifying one or more relevant categories may comprise inputting at least part of the updated system state information into a dialogue topic tracker model, which obtains a probability that each dialogue topic is relevant based on the updated system state and identifies the most relevant dialogue topic, wherein the relevant categories comprise categories from the pre-defined domain-specific ontology corresponding to the most relevant dialogue topic and wherein the reduced system state does not comprise probability values associated with any of the plurality of possible values for any of the categories which were not identified as relevant.

The categories may be slots.

Updating one or more system states may comprise updating a plurality of system states based on the input data using a plurality of state tracker models, wherein each system state comprises probability values associated with each of a plurality of possible values for each of a plurality of categories associated with a pre-defined domain.

There is also provided a dialogue method comprising:
  receiving data relating to a speech or text signal originating from a user;
  updating one or more system states based on the input data using one or more state tracker models, wherein the one or more system states comprise probability values associated with each of a plurality of possible values for each of a plurality of categories, wherein a category corresponds to a subject that the speech or text signal may relate to and can take on one or more values from a set of values;
  determining an action function and determining an action function input by inputting information generated using the system state and a set of stored information into a policy model, the set of stored information comprising a plurality of action functions;
  outputting information specified by the determined action function and the determined action function input at the output.

There is also provided a method of adapting a dialogue system, by using the system repeatedly to run through dialogues with a human or a simulated human and providing a performance indicator for each dialogue, and wherein the method further comprises:
  receiving data relating to a speech or text signal in a dialogue;
  updating a system state based on the input data using a state tracker model, wherein the system state comprises probability values associated with each of a plurality of possible values for each of a plurality of categories, wherein a category corresponds to a subject that the speech or text signal may relate to and can take on one or more values from a set of values;
  determining an action function and determining an action function input by inputting information generated using the system state and a set of stored information into a policy model, the set of stored information comprising a plurality of action functions;
  outputting information specified by the determined action function and the determined action function input at the output;
  adapting the policy model to increase the performance indicator.

The inputted information generated using the system state or the set of stored information may comprise a set of possible action function inputs, and wherein determining an action function and determining an action function input comprises:
  for each possible action function input generating a vector of values, wherein each value in each vector corresponds to an action function and is an estimate of the dialogue performance if the action function and action function input are used to generate the output information, the values being generated from stored parameters;

for each vector, identifying the action function corresponding to the highest value;
wherein the determined action function and action function input corresponds to the action function corresponding to the highest value from all of the vectors
and wherein adapting the policy model comprises updating the stored parameters based on the performance indicator.

Where the set of stored information comprises a plurality of action function inputs, wherein the action function inputs comprise categories, the method may further comprise:
identifying one or more relevant categories;
wherein the set of information excluding categories which were not identified as relevant; and
wherein the system state is a reduced system state, comprising the probability values associated with one or more of the plurality of possible values for each of the relevant categories.

The one or more relevant categories may be identified based on at least part of an input system state information using an identifier model.

The method may further comprise, for each category present in the dialogues, determining a cumulative moving average of the ratio of the performance indicator achieved to the maximum possible performance indicator as an estimate of category importance, wherein the importance is used as one of the second set of parameters.

The method may further comprise, for each category in the dialogues, determining a cumulative moving average of the relative position in the dialogue as an estimate of category priority, wherein the priority is used as one of the second set of parameters.

There is also provided a carrier medium comprising computer readable code configured to cause a computer to perform the any of the above methods.

Since some methods in accordance with embodiments can be implemented by software, some embodiments encompass computer code provided to a general purpose computer on any suitable carrier medium. The carrier medium can comprise a storage medium such as a floppy disk, a CD ROM, a magnetic device or a programmable memory device, or any transient medium such as any signal e.g. an electrical, optical or microwave signal. The carrier medium may comprise a non-transitory computer readable storage medium.

In many task-oriented spoken dialogue systems the ontology will specify a plurality of slots to be filled with one (or multiple) of a plurality of possible values. The policy is then configured to control the flow of the conversation to fill slots with a value in order to complete the task. For example, in a Partially Observable Markov Decision Process spoken dialogue system (POMDP-SDS), at each turn in a dialogue, a list of Automatic Speech Recognition (ASR) hypotheses with confidences scores (called an ASR n-best list) are observed, which may be parsed by a Spoken Language Understanding (SLU) unit to obtain an n-best list of semantic representations (dialogue acts). After this, a distributional representation of dialogue states (comprising user's goal and dialogue history), called a belief state, is maintained by a dialogue state tracking model which updates the belief at each turn of a dialogue based on the SLU outputs and the previous system action for example. A policy model 18 determines the next system action in semantic representation, which is then realised by a Natural Language Generation (NLG) module and is read to the user by a Text-to-speech (TTS) synthesiser. The policy model 18 and one or more other components may be connected neural networks, or may be replaced by a single neural network for example.

FIG. 1(*a*) is an overview of an example of such a SDS general architecture. Such spoken dialogue systems may comprise a number of components to, for example, convert speech from a human user 10 into text (automatic speech recognition 12), identify and collate semantic information (natural language processor 14), update a system state (system state tracker 16), generate an output action (policy model 18), generate the necessary text specified by the action (natural language generator 20) and synthesize speech (text to speech synthesizer 22). Alternatively, the policy model 18 and one or more other components may be replaced by a single neural network for example.

FIG. 1(*b*) is a schematic illustration of a dialogue system 1. The dialogue system 1 may be an information retrieval SDS. The system 1 comprises a processor 3, and takes inputs which are representations of human utterance. This may be a semantic representation of a human utterance, or a collection of data representing information extracted from a human utterance. It may be speech or text signals. The system may also output a semantic representation, text or speech signals, or other output information, for example instructions to a device to perform a task such as an instruction for a phone to put through a call. The processor may be a dialogue manager and may implement a policy in order to determine the actions to be taken by the system 1.

A computer program 5 is stored in non-volatile memory. The non-volatile memory is accessed by the processor 3 and the stored computer program code is retrieved and executed by the processor 3. The storage 7 stores data that is used by the program 5.

The system 1 further comprises an input module 11. The input module 11 is connected to an input 15 for receiving data relating to a speech or text signal. The input 15 may be an interface that allows a user to directly input data, for example a microphone or a keyboard. Alternatively, the input 15 may be a receiver for receiving data from an external storage medium or a network. The representation may be received from a semantic decoder.

The system 1 may further comprise an output module 13. Connected to the output module 13 may be an output 17. The output 17 may be an interface that provides data to the user, for example a screen, headphones or a speaker. Alternatively, the output 17 may be a transmitter for transmitting data to an external storage medium or a network. Alternatively, the output 17 may provide instructions to another device or part of a device.

In use, the system 1 receives speech or text signals through the input 15. The program 5 is executed on processor 3 in the manner which will be described with reference to the following figures. It may output a text or speech signal at the output 17.

The system 1 may be configured and adapted in the manner which will be described with reference to the following figures. Examples for spoken dialogue systems may be described, however any dialogue system, for example text based dialogue systems may operate and be configured in a similar manner.

FIG. 2 is a flow chart showing an example method performed by the dialogue system.

The system stores ontology information in the storage 7. The ontology information comprises action functions, categories and possible values for the categories.

A category corresponds to a subject that the speech or text signal may relate to and can take on one or more values from the set of possible values corresponding to the category. A category may be a slot in an information retrieval SDS for example.

An action function is a communicative function. An action function takes an action function input. An action is generated by combining the action function input with the action function. For full system actions, the action function input may be null (e.g. for actions such as reqmore( ), hello( ), thankyou( ), . . . ); may comprise one or more categories (e.g. for actions such as request(food), . . . ); or may comprise one or more categories and one or more values for each category (e.g. for actions such as confirm (area=north), select(food=Chinese, food=Japanese), offer (name="Peking Restaurant", food=Chinese, area=centre), . . . ). For summary actions, which will be described later, the action function input may be null or may comprise one or more categories. Values are not included. Only summary actions for which the action function input is one category may be used for example. In this case, each action function input is a single category.

Each category corresponds to one or more pre-defined domain-specific ontologies, so that the system stores ontology information from a plurality of different pre-defined domain-specific ontologies. A pre-defined domain corresponds to a particular dialogue topic. The pre-defined domain may be specific to the type and purpose of the dialogues, e.g. providing the user with a number of restaurants which match certain criteria, or identifying a suitable laptop for a buyer. A pre-defined domain may have a domain-specific ontology which comprises the types, properties and interrelationships of the entities specific to that domain. A pre-defined domain-specific ontology may comprise the plurality of categories relating to the particular dialogue topic.

The action functions are independent of the pre-defined domains. An action generated from an action function is independent of the pre-defined domains if the action function input is null, but is domain dependent if the action function input comprises a category.

The information from several pre-defined domain-specific ontologies is stored in the present system, and can be considered to be a single, multi-pre-defined-domain ontology. Thus the system stores ontology information comprising the domain independent action functions and also comprising categories and the set of possible values for each of a plurality of pre-defined domains $D_1$ to $D_N$. Here, N is used to represent the total number of pre-defined domains. Ontology information from one or more pre-defined domains can be added or removed at any stage.

By parameterising the categories using domain independent parameters, the categories can be made independent of the domains. In such a system, the actions comprise an action function and a parameterised category as the action function input (or null). These actions, in this form, are inputted into the policy model together with the parameterised system state for the current dialogue turn. Thus a list of actions, comprising action functions combined with parameterised action function inputs is inputted into the policy model, and the policy model selects and outputs one of these actions, comprising the action function combined with the parameterised input. Thus some kind of mapping from the policy model output to the 'true' action-slot pair is necessary, i.e. mapping to an action comprising an action function and a domain-dependent slot (not parameterised) as action function input. The parameterisation allows the policy to abstract away from the specifics of each pre-defined domain. However, such systems may still use handcrafted rules to map the selected action back to the true domain dependent space. In the methods described below however, such mapping may be automated, i.e. the policy model may output a domain independent action function and a separate, domain dependent input (or null input).

The dialogue policy model in the below described systems and methods is configured to make two decisions at each dialogue turn. In other words, instead of making one decision at each dialogue turn (which action to output), it makes two decisions: 1) which domain-independent action function to take; 2) which action function input (e.g. category) to choose. The policy may be configured to determine a domain specific action function input, thereby automatically generating the action-slot pair. This is done by generating, for each domain dependent action function input, a vector of values. Each value in each vector corresponds to an action function and is an estimate of the dialogue performance if the action function and action function input are selected (e.g. Q values). The values are generated from stored parameters, and are generated using the parameterised form of the action function input corresponding to the vector. For each vector, the action function corresponding to the highest value is identified. The determined action function and action function input outputted for the dialogue turn corresponds to the action function corresponding to the highest value from all of the vectors (and the action function input corresponding to the vector in which this highest value was found). By taking two decisions in this manner (which action function to take and which domain dependent input (e.g. slot) to choose) the policy model automatically transforms the generic action-slot pair into a domain-specific action-slot pair.

Since the input to the policy model comprises a set number of domain independent action functions, kernel methods such as GP-SARSA may be able to scale easily, since the action kernel is fixed with respect to the number and size of the pre-defined domains. Furthermore, Neural Network (NN) approaches may be used, since the number of actions is fixed. By bounding the number of action functions over which the policy needs to decide, the latter is not dependent on the size of any given pre-defined domain, with respect to both actions and slots. When domain independent parameterisation is used, the NN model depends on the number of action functions, and the number of parameter features used. Even if more slots are added (i.e. more domains), they are still mapped to the same size DIP vector, so the NN model remains of fixed size.

When used together with domain independent parameterisation of the categories, the dialogue policy can operate in a domain independent slot-action space, meaning that the Q values are generated using the domain independent parameters for each action function input and the domain independent action functions. However, the Q values are generated for each domain dependent slot at a time, meaning that the output comprises a domain specific action function input. Thus the slots used to generate the Q values are defined in terms of domain independent parameters, and the actions are replaced by separate domain independent action functions. Domain independence with respect to actions is achieved by defining a set of generic action functions that are relevant to the progress of the dialogue rather than to specific domains. An example set of such actions could be: [hello, bye, inform, confirm, select, request, request more, repeat]. The learning algorithm then takes as input the current state (in which the slots are defined in terms of domain independent parameters) and outputs a domain-independent action function as well as a domain-specific slot. This is done by parameterising the slots in real-time, as the Q values are generated, where each Q value is generated corresponding to a domain-specific input (slot) but using the domain independent parameters corresponding to the input. Thus when the dialogue runs, the policy model generates probability distributions for the domain-specific inputs (slots), using the domain independent parameters. The updated system states are parameterised before being input into the policy model however.

Figure 4:
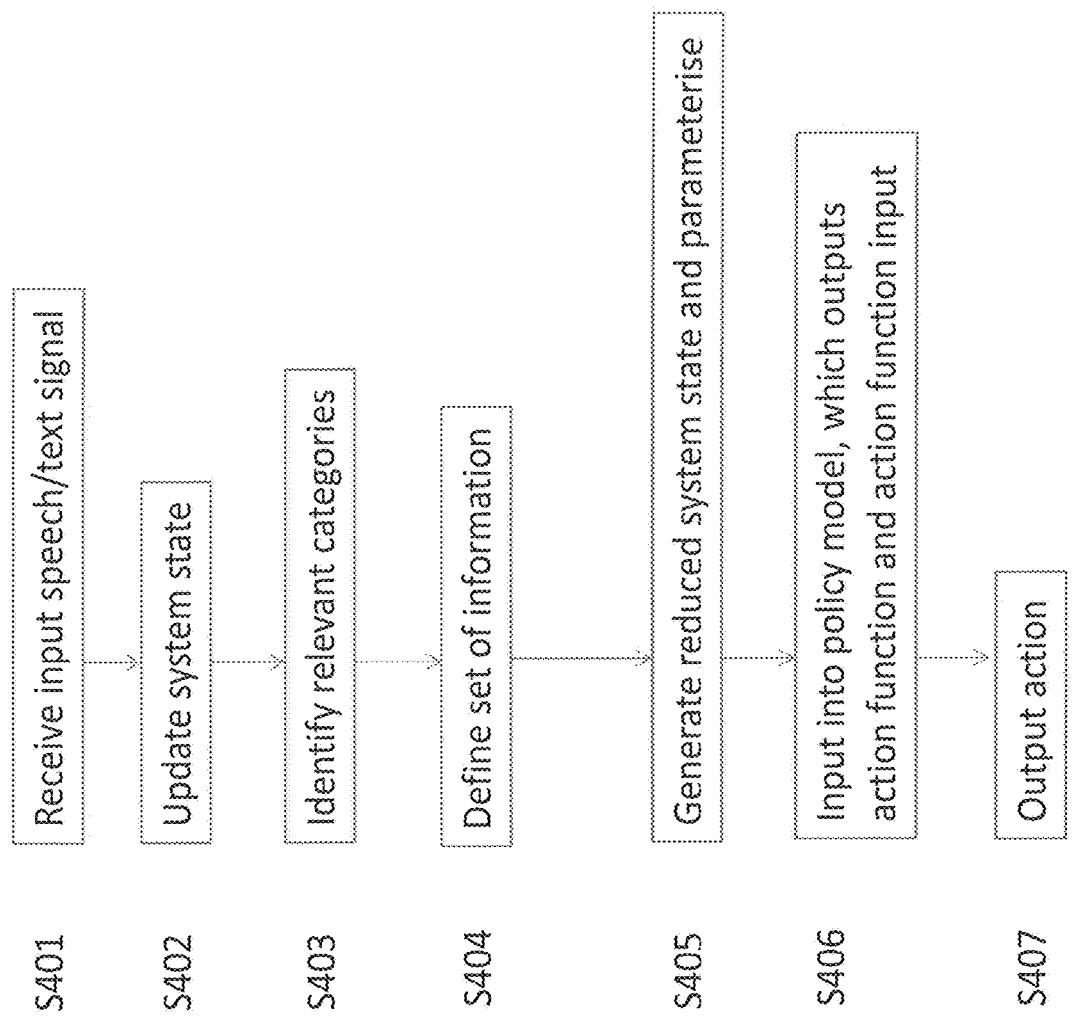
FIG. 4 is a flow chart showing an example method performed by a dialogue system, using domain independent parameterisation.

The method described in relation to FIG. 2 relates to the general case. FIG. 4 shows a method in which domain independent parameterisation is used.

In step S201, a representation of human utterance is received, e.g. an input speech or text signal. The utterance is part of a dialogue with a user.

If an input speech signal is received, the system may comprise an automatic speech recognition (ASR) module to generate a text signal from the input speech.

The system may further comprise a natural language processor module, which generates an n-best list of language understanding hypotheses with associated probabilities from an input text signal, or a text signal generated by an ASR module.

In S202, a system state is updated based on the input using a state tracker model. The system state may also be referred to as a dialogue state. The tracker model may be an intent recognition model. The text and associated confidence score generated in S201 are inputted into the tracker model, which outputs an updated system state. For example, the n-best list of hypotheses outputted from S201 (which may for example be only the hypothesis with the highest associated probability) is inputted into the state tracker model. The state tracker model uses probability distributions for slot values, given the hypotheses, which are stored in memory.

A system state comprises probability values associated with each of a plurality of possible values for each of a plurality of categories.

The categories may be slots, for example in a task-oriented spoken dialogue system. In such a system, the policy is in general configured to control the flow of the conversation to fill slots with a value in order to complete the task. Each slot is associated with two or more values, where a value is a possible valid response that the dialogue manager can recognise in relation to a slot. For example, in a pre-defined domain "restaurants", a slot may be "price" and possible values may be "low", "mid", and "high".

In some cases, a slot may have the possible values "provided" and "not provided". For example, for the case where the user is looking for a specific restaurant by name, the arbitrary restaurant name is saved in a variable and the slot takes two values: "restaurant name provided" and "restaurant name not provided". The variable is used to store the actual name of the restaurant. For example, initially, the variable will be empty and the slot will have the value "name not provided". If the user asks for 'Wok-wok restaurant' then the variable will store that name, and the slot will take the 'name provided' value. Only the slot and value is inputted into the policy model (in subsequent step S206) however, the actual restaurant name is simply stored as part of the system state. Once the action has been generated by the policy model (in subsequent step S206) the variable is added to the action e.g. inform(name='Wok-wok').

The state tracker model may be a POMDP based model, and the system state in this case is a belief state. The following example will be described for a system which uses a POMDP based belief state tracker model, however it is to be understood that other systems may be used, for example Markov decision process speech dialogue systems (MDP-SDS).

A belief state may comprise or represent some or all of the system's observations in the dialogue sequence, wherein an observation is an input to the system. As such, a belief state may track, comprise or be determined by all of the preceding inputs to the system made by a user in the dialogue sequence. A belief state therefore may provide a full dialogue history and context.

Thus in S202, for an input speech or text signal in the dialogue occurring at time t, a belief state is updated, giving $B_t(\hat{S})$. The belief state at time t, $B_t(\hat{S})$, comprises a vector $b_s$ of the beliefs with respect to each slot s. The belief with respect to a slot s may be the set of the probabilities that the slot has each possible value. For example, for the slot "price", the values and probabilities may be: [empty: 0.15, cheap: 0.35, moderate: 0.1, expensive: 0.4]. These probabilities are updated by the tracker model at each time slot t based on the new input utterance. The belief tracker model is a stored trained model that maps the input utterance to slot values, and updates the probabilities accordingly.

The belief state may also comprise slot independent beliefs, for example beliefs that relate to the dialogue history. It may also comprise joint beliefs, which are probability distributions over the values of more than one slot, e.g. price and location (the probability that the user said both "cheap restaurant" and "centre of town").

Optionally, a plurality of state tracker models are used in S202. As described above, the system stores ontology information from a plurality of different pre-defined domain-specific ontologies. The system may comprise a plurality of state tracker models, corresponding to a plurality of, or to each of, the pre-defined domains. Each state tracker model updates a pre-defined domain specific belief state, which comprises probability values associated with each of a plurality of possible values for each of a plurality of slots which are associated with the specific pre-defined domain. At time t, there is therefore generated a plurality of belief states, $B_{D_n,t}(\hat{S})$, where the index n is used to identify the pre-defined domain. Each belief state $B_{D_n,t}(\hat{S})$ is generated by a separate tracker model, which is trained prior to implementation for the specific pre-defined domain, i.e. it is trained using data relating to that pre-defined domain. The belief state $B_{D_n,t}(\hat{S})$ comprises a vector $b_s$ of the beliefs with respect to each slot s from the domain $D_n$.

A single combined belief state $B_t(\hat{S})$ may then be formed from the N belief states. The combined belief state comprises a vector $b_s$ of the beliefs with respect to each unique slot from all of the pre-defined domains. Only the unique slots are kept. In other words, since the pre-defined domains may have overlapping features (such as beliefs about location, price, etc.) each overlapping feature is only included once in the combined belief state. If a slot is present in many domain-specific belief states, then the slot with the highest probability may be selected and used for the combined belief state for example. If a slot hasn't been mentioned in the current turn, then the most recent probabilities are used for that slot.

This combined belief state is not specific to a particular pre-defined domain but contains the beliefs for all of the pre-defined domains. Thus in this case the step S202 comprises two steps: updating the belief state for each pre-defined domain and forming the combined belief state. The output of S202 for an input speech or text signal inputted at time t in the dialogue is a belief state $B_t(\hat{S})$ which comprises the beliefs with respect to each unique slot across the plurality of pre-defined domains.

Alternatively, a single state tracker model is used. This state tracker model is trained prior to implementation on data relating to multiple pre-defined domains. It outputs a single global belief state $B_t(\hat{S})$ at time t, which comprises the beliefs with respect to each unique slot across multiple pre-defined domains.

Alternatively, separate system states for each pre-defined domain are maintained, instead of generating a combined belief state.

Optionally, in S203, the relevant categories for the current system state are identified. It is to be understood that S203 to S205 described below are optional, and alternatively, the combined belief state across the pre-defined domains, or a plurality of belief states across the pre-defined domains, together with a set of ontology information from across the pre-defined domains is used and inputted into the policy model in S206. Since the categories are comprised in the system state, optionally, the set of information may not include the action function inputs, and these may be retrieved from the system state. In this case, the set of information simply comprises the action functions.

Optionally, in S203, a topic tracker model may be used to identify the pre-defined domain that most closely matches the input. In this case, S203 comprises identifying a pre-defined domain and then deterministically selecting the categories from the pre-defined domain. The input to a topic tracker model for each turn in the dialogue is the user's utterance in textual form. The topic tracker may be either one model (configured to classify the sentence into one of the available domains), or multiple models (each configured to give a confidence score that the utterance belongs to a particular domain) that are combined (e.g. to find the domain with the highest score). A multi-domain system state may still be generated initially, before the relevant categories are identified (instead of one state for each domain) to allow sharing of information between domains (for example if the user booked a hotel at the centre then they may want restaurants that are nearby). Alternatively, separate system states for each pre-defined domain are maintained, instead of generating a combined belief state.

Figure 3:
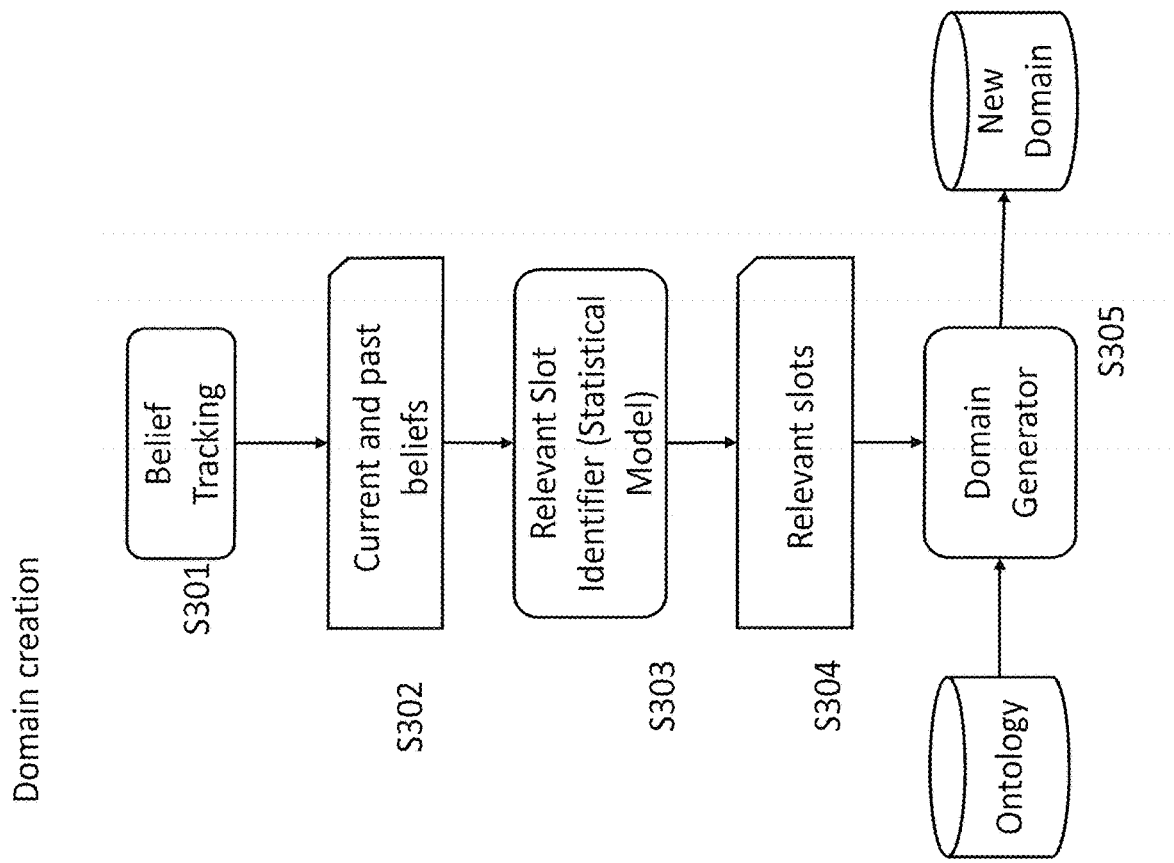
FIG. 3 is a flow chart showing an example method performed by an identifier model to identify the relevant categories.

Alternatively, an identifier model identifies the relevant categories for the current system state, from all of the unique categories in the stored ontology. The set of identified relevant categories may comprise categories from different pre-defined domain-specific ontologies. Thus one or more relevant categories are identified based on at least part of the updated system state information using an identifier model. The identifier model is a stored trained model configured to identify at each dialogue turn which categories are relevant for the dialogue to progress. This allows creation of "sub-domains" (in subsequent step S204) on the fly that do not need to be pre-defined. This option is described further in relation to FIG. 3 below.

The output of S203 is a list of categories which have been identified as relevant.

The system stores information, comprising domain independent action functions, categories and possible values. In S204, the system defines a set of information from stored information, the stored information comprising a plurality of action functions and the plurality of categories from across the pre-defined domains, the set of information excluding categories which were not identified as relevant in S203.

If a pre-defined domain is identified in S203, then the categories from the domains other than the identified pre-defined domain are excluded in this step. The set of information thus comprises the domain independent action functions and the categories from the identified pre-defined domain. Otherwise, the categories are those identified as relevant from across the domains (or all categories from across the pre-defined domains, where S203 to S205 are not performed).

The categories are identified as relevant in S203, and the set of information comprising those categories and the domain independent action functions is deterministically defined in S204.

A full system action a can take one of the following forms: $f_a()$ (e.g. reqmore( ), hello( ), thankyou( ), etc.); $f_a(s)$ (e.g. request(food)); $f_a(s=v)$ (e.g. confirm(area=north)); $f_a(s=v_1; s=v_2)$ (e.g. select(food=Chinese, food=Japanese)); and $f_a(s_1=v_1, s_2=v_2, \ldots, s_n=v_n)$ (e.g. offer(name="Peking Restaurant", food=Chinese, area=centre)). Here $f_a$ is an action function, e.g. a communicative function, that is domain-independent, and $s_x$ and $v_x$ denote slots and values respectively. In general, a full system action a takes the form $f_a(i_a)$, where $i_a$ is an action function input and may be null, one or more categories, or one or more categories and one or more values for each category.

Instead of full system actions, summary actions may be used. For summary actions, the action function input $i_a$ may be null or one or more categories. Summary actions where the action function inputs are single categories may be used. In this case, each action function input is a single category. The action function input does not comprise values. A summary action can be mapped back to a full system action by substituting in the top value in the current belief state for the slot. Thus using summary actions excludes all full system actions with values other than the top value. The below will be described for a system using summary actions, for which each action function input is a category, however full system actions can be used in a similar manner.

The stored information thus comprises a stored set of action functions which are domain independent (e.g. greet, inform, request, . . . ). The stored information also comprises action function inputs, in this case categories (e.g. price, location), from a plurality of pre-defined domains. The relevant categories are identified for the current turn in S203, and the set of information comprising action function inputs and the action functions is defined in S204. The set is defined by excluding those action function inputs including categories which are not one of the relevant categories identified in S203. Since summary actions are used, no values are included in the action function inputs. Since the categories are comprised in the belief state, optionally, the set of information may not include the action function inputs, and these may be retrieved from the belief state. In this case, the set of information is the same for each dialogue turn, and simply comprises the action functions.

In S205, a reduced system state $B_r$ is generated from the combined system state $B_t(\hat{S})$ generated in S202. The reduced system state comprises the probability values associated with one or more of the plurality of possible values for each of the relevant categories identified in S203. Thus the vector $b_s$ of the beliefs with respect to each unique slot from all of the pre-defined domains is reduced to a vector of the relevant beliefs only. The reduced system state does not comprise probability values associated with categories that were not identified as relevant in S203.

Optionally, the reduced system state is summarised to contain only the n-best values for each slot, e.g. only the value corresponding to the highest probability for each category (summary beliefs). Where a pre-defined domain is identified in S203, the belief state comprises the categories from that pre-defined domain, and no others. Joint beliefs may be included in the reduced belief state when all corresponding slots have been selected as relevant in S203. As has been described above, alternatively a combined belief state may be used (which may also be summarised).

In S206, the reduced system state generated in S205 and the set of information defined in S204 are inputted into a policy model. The system may use a single multi-domain dialogue policy model.

The policy model is trained prior to implementation to output an action function $f_a$ and an action function input $i_a$. The input to the policy model is the reduced system state $B_r$ (e.g. comprising the relevant categories and top value for each category) generated in S205 and stored set of ontology information (e.g. comprising the action functions and action function inputs, which in this case are categories) defined in S204.

The policy may do this by defining a probability distribution over action functions $f_a$ and a probability distribution over action function inputs $i_a$. The policy model is optimised prior to implementation by estimating the expected long-term reward for a system action a being executed at a system state B, such that the action with maximum expected reward is then selected at each dialogue turn during implementation.

Specifically, dialogue policy optimisation can be solved via Reinforcement Learning (RL), where the goal during learning is to estimate a quantity $Q(B, f_a, i_a)$, for each B, $f_a$, and $i_a$, reflecting the expected cumulative rewards of the system executing action a, corresponding to action function $f_a$ with action function input $i_a$, for an input state B. This is done by learning a set of stored parameters, which are used to generate Q values for each combination of $f_a$ and $i_a$ given an input system state B during implementation. The combination of $f_a$ and $i_a$ corresponding to the highest Q value is then selected.

The policy model comprises stored parameters, which allow Q values to be generated, given the input system state B. A system state B is updated for the dialogue turn. For each action function input $i_a$, a vector of Q values may be generated using the stored parameters. The vector of Q values corresponds to $Q(B, *, i_a)$. Each row in the vector corresponds to an action function $f_a$. In this case, the action function inputs are categories, so that each vector corresponds to a category. For each vector, the entry with the highest Q value (corresponding to an action function) is taken, and used to update a stored maximum action function and action function input. For example, for the first generated vector, the action function and input with the maximum Q value for the vector are simply stored as the maximum action function and input. For each subsequently generated vector, the action function and input with the maximum Q value for the vector may be stored as well (and all the stored Q values compared at the end of the process), or it may be compared with the already stored action function and input and replace the stored action function and input if the Q value is larger than the stored Q value.

The model iterates over all of the vectors (i.e. all action function inputs, in this case categories), each time updating the maximum action function and action function input.

The Q values are generated in real time. The action function $f_a$ and input $i_a$ corresponding to the highest Q value is then selected. The parameters used to generate the Q values were generated during the training stage, prior to implementation.

Thus instead of generating a single vector of Q values for an input system state B, each row in the vector corresponding to an action, the policy model generates a plurality of vectors of Q values, mapping each combination of $f_a$ and $i_a$ for the input system state. For example, a neural network based policy model may store parameters, and output a vector of Q values, given the input (parameterised slot). Iterating over the slots in B, and observing the network's output for each, allows selection of an action function and action function input. The policy model outputs action functions and action function inputs. Instead of generating Q values Q(B, a) it generates Q values $Q(B, f_a, i_a)$.

Thus the reduced system state $B_r$ output from S205 and the set of ontology information output from S204 are inputted into the policy model in S206, and the vectors of Q values are generated. Thus a plurality of vectors of Q values are generated in real time, corresponding to the input system state $B_r$ and where each vector corresponds to an action function input (slot) and each row in each vector corresponds to an action function $f_a$. The entry with the highest Q value from the vector is used to update the stored maximum action function and action function input, before the next vector is generated. Once vectors for all of the action function inputs have been generated, the action function input and action function corresponding to the highest Q value is outputted. This corresponds to the action function and action function input combination with the highest expected long-term reward, as determined during training. The action function $f_a$ and the action function input $i_a$ corresponding to this entry are then outputted from the policy model.

Thus for each action input $i_a$, a vector that corresponds to $Q(B, *, i_a)$ is generated. The position with the max value is stored (that corresponds to an action function). Iterating over all possible $i_a$ is essentially searching a Q matrix row by row, every time updating the max $f_a$ and max $i_a$. The Q values can be considered to be 3D matrix, where for each dialogue turn, the element Q(B, *, *) is considered, which is a 2D matrix. Each column of this 2D matrix is generated in turn however. The location of the maximum value, whose 'coordinates' correspond to $f_a$ and $i_a$ is found. The policy model is a stored model, that takes input B and $f_a$ and $i_a$ and produces $Q(B, f_a, i_a)$.

A neural network may be used to generate the vector of Q values for each input. Thus the parameterised belief state B and a parameterised action function input are inputted into the neural network, which generates a Q value for each action function $f_a$, and outputs the action function corresponding to the maximum Q value. The policy model uses these values to update the action function and action function input corresponding to the maximum Q value. This may be done either by adding them to a stored list, or by comparing the Q value with the previously stored value and replacing the previously stored action function, input and Q value if the new value is larger. The policy model iterates over all possible inputs (slots) to determine the maximum Q, and outputs both input and action function corresponding to this value.

As described above, where summary actions are used, the action function inputs are just categories. Thus each action function input corresponds to a category. For action functions which take a null input, the policy model will still output the action function and a category as the action function input. A rule may be stored which recognises the action function as requiring a null input and discards the category. Alternatively, "null" may be one of the action function inputs.

Thus step S206 comprises, for each action function input, generating a vector of values, wherein each value in each vector corresponds to an action function and is an estimate of the dialogue performance if the action function and action function input are selected, the values being generated from stored parameters. For each vector, the action function corresponding to the highest value is identified. The determined action function and action function input outputted from S206 for the dialogue turn corresponds to the action function corresponding to the highest value from all of the vectors. The stored parameters are learned parameters. The estimate of dialogue performance is the expected value of a reward function for the dialogue.

As has been described above, the system states which are inputted may be summary system states, that is, wherein one or more of the values with the highest probability are included for each category, and none of the other values are included for the category.

The dialogue policy takes as input the current system state (which may comprise the previous system action along with any other features), and outputs the next domain-independent system action and input (slot). Other features included in the belief state may be for example, if the system has already shown an item to the user, or if the user has been greeted, etc. Instead of selecting the maximum value Q from the Q values Q($B_r$, a) (which is a vector of size |A|, where A is the action set, since $B_r$ is given) for the input system state $B_r$, the method creates parts of Q in real time, comprising vectors of the Q values Q($B_r$, $i_a$, *) (where each vector is of size |$F_a$| and where there are |$I_a$| vectors, where $F_a$ is the action function set and $I_a$ is the action function input set defined in S204). Therefore, by finding the input $i_a$ in $I_a$ and action function $f_a$ in $F_a$ with the maximum Q value from these vectors, the policy model effectively selects both the appropriate input (e.g. slot) and next action function.

In S207, the determined action function input is inputted into the determined action function to produce an action. The action is generated as a combination of $f_a$ and $i_a$: $f_a(i_a)$. The action function is a function and the action function input (e.g. slot) is the argument.

Information specified by this action is outputted at the output. This may be a text signal, or a speech signal generated from a text signal for example.

As has been described above, the relevant categories may be identified in S203 by identifying a pre-defined domain using a topic tracker model. Alternatively, an identifier model may be used to identify the relevant categories in S203. This will be described in more detail in relation to FIG. 3 below.

In S301, belief state tracking is performed. This is an example of system state updating, and corresponds to S202 described above.

In S302, one or more relevant categories are identified based on at least part of the updated system state information using an identifier model. The identifier model is a stored trained model configured to identify at each dialogue turn which categories are relevant for the dialogue to progress. This allows creation of "sub-domains" (in subsequent step S305) on the fly that do not need to be pre-defined.

Optionally, the at least part of the updated system state is the top belief for each slot (e.g. expensive=0.4 for the slot "price"). The system state in this case is "summarised" such that only the n values having the highest probability for each category are included, e.g. only top value for each category is included. This "summary" system state is then inputted into the identifier model and the other values for each category are not inputted into the identifier model. The summary system state thus comprises all of the categories across the multiple pre-defined domains, but only limited number of values and corresponding probability values for each slot. Alternatively, all of the possible values for each category may be inputted into the identifier model.

In S302, the belief state is extracted and input into the identifier model in S303. The model identifies the relevant slots in S303 and outputs these in S304. Steps S302 to S304 correspond to S203 described above.

Step S302 comprises inputting the at least part of the updated system state information generated in S301 into the identifier model. The identifier model is configured to map input system states to category relevance, where the input system states may be summary system states as described above. The identifier thus outputs a relevance score for each unique slot among all the pre-defined domains. Optionally, a threshold score may be defined, such that slots having a relevance score greater than or equal to the threshold score are determined to be relevant.

Optionally, the updated system states for each new input signal in a dialogue are stored for a period of time. In other words, a dialogue history is stored. The previous system states for the entire dialogue may be stored, and may then be erased when the dialogue is terminated. Alternatively, one or more of the previous states in the dialogue are stored on a rolling basis. Step S302 may then comprise inputting the at least part of the updated system state information for one or more of the previous input signals into the identifier model. Optionally, the input is a concatenation of past belief states, multiplied by a forgetting factor. The forgetting factor may be a number between 0 and 1 for example.

Optionally, a window of size w can be defined, and the input to the identifier model generated as a concatenation of the past belief states:

$$B_{in} = B_t(\hat{S}) \oplus f B_{t-1}(\hat{S}) \oplus \ldots \oplus f^{w-1} B_{t-w-1}(\hat{S})$$

$\oplus$ stands for the operator to concatenate two vectors. The window w controls how far back the input goes. For example, w may be equal to 3. t is a discrete time index, where each time t corresponds to an input utterance. The forgetting factor means that more recent beliefs have a greater effect. Initially for each dialogue, the input buffer can be padded with zeros, when not enough past beliefs are available for the dialogue to fill the entire window. The final belief state "$B_{in}$" has w times the number of features of $B_t$.

The relevant slots are then used to generate the sub-domain from the stored ontology (which comprises action functions and action function inputs) in S305. This corresponds to S204 in FIG. 2. A set of information is defined using the stored information. This is output in S305 as a new sub-domain. This process is repeated for each dialogue turn, i.e. after the user's utterance.

Thus at every dialogue turn, the slot identifier model receives as input a belief state comprising the unique features across multiple pre-defined domains. A feature can for example be the distribution of values for a slot (e.g. price: [empty: 0.15, cheap: 0.35, moderate: 0.1, expensive: 0.4]). Only the top belief for each slot (e.g. price: [expensive: 0.4]) may be taken, in order to simplify. The output of the slot identifier is a set of slots that are relevant to the current dialogue turn. These slots are used to create a sub-domain at run-time and use it for the current dialogue turn.

Optionally, the identifier model is a deep neural network (DNN). During training, the DNN learns to map the input belief states to relevant slots. Other classifiers/models trained differently can alternatively be used. Training of the identifier is described in further detail below.

Optionally, during implementation, the statistical identifier model does not learn (i.e. it does not update its internal weights) and only maps belief states to relevant slots. These slots are then used to generate a new sub-domain for the current dialogue turn. Alternatively, the identifier model may continue to update during implementation.

Alternatively, S203 to S205 are not included, and the combined belief state, comprising the categories across all of the pre-defined domains is used, together with the ontology information from across all of the pre-defined domains.

A domain independent parameterisation based policy model may be used in such systems, as described below.

FIG. 4 is a flow chart showing an example method performed by the spoken dialogue system, using domain independent parameterisation (DIP). Although a DIP based policy is described here, an alternative policy may be used, which is trained on the multiple pre-defined domains.

S401 to S403 correspond to S201 to S203 described above.

In S404, the set of information, comprising the action functions and action function inputs is defined as has been described above in relation to S204. The set of action function inputs comprises relevant categories. The action function inputs are then parameterised, so that they are defined in terms of domain independent parameters. This parameterisation, which will be referred to as "ontology parameterisation" is described in more detail below. Some of the parameters (i.e. those which do not depend on information from the current dialogue turn) may be stored for each category. This step may not be performed where the domain is the same as for the previous slot (e.g. where the same pre-defined domain has been selected as for the previous turn). Since the categories are comprised in the system state, optionally, the set of information may not include the action function inputs, and these may be retrieved from the system state. In this case, the set of information simply comprises the action functions.

A reduced belief state, comprising the slots which were identified as relevant by the statistical model in the sub-domain creator 403, is then generated in S405. This corresponds to S205 in FIG. 2. The reduced system state is then parameterised by a domain independent parameterisation (DIP) before being input into the policy model. Again, this is described in more detail below.

The policy model is configured to operate with a parameterised system state input and a parameterised ontology.

Instead of being a separate step, S404, in which the ontology information is parameterised before being inputted into the policy model, alternatively is performed during the operation of the policy model. In other words, the categories may be parameterised in real time whilst the Q vectors are determined. In this case, the policy model takes parameterised input system states, but outputs domain dependent action function inputs (slots). For example, a neural network based policy model may operate in the following manner. For each dialogue turn, a vector of Q values is generated for each category, given the parameterised input system state. Each row in each vector corresponds to an action function. To generate each Q vector, the category corresponding to the Q vector is parameterised, and the Q values for each combination of the set of parameter values corresponding to the category and the action function corresponding to the row is generated and inputted into the vector. The categories may be parameterised using a different parameterisation function for each row, i.e. each action function.

The vector thus corresponds to a domain dependent category, however the Q values are generated using the domain independent parameters corresponding to the category. In this way, the ontology information is parameterised in real time by the policy model, and for each action function input in the inputted set of ontology information (category), the policy model calculates the DIP features given the belief and generates an estimate of the Q value. The Q vectors correspond to the domain dependent slots. As described before, for each vector, the action function that has the highest Q value is used to update the stored maximum action function and input information, and then once all the vectors have been generated, the final maximum function and input are selected. The system state B is thus parameterised before being inputted into the policy model, as in S405. The action functions are domain independent, and therefore are not parameterised before being inputted into the policy model. The action function inputs, in this case categories, are parameterised during operation of the policy model. They may alternatively be parameterised in one step before being inputted, and the parameters retrieved as each vector is generated.

Again, the above has been explained for the case where each action function input is a slot, however, for the general action function input case it operates in a similar manner. In other words, if summary actions are not used then the action function input would include the slot's value, which can also be parameterised. For action functions with null input, the slot that the policy model outputs may be disregarded.

Thus S404 may be performed before the set of ontology information is inputted, in which case the policy model can output a parameterised slot as the action function input, which is then converted back to the original slot, or S404 may be performed for each category in turn during operation of the policy model, in which case the policy model can output the original slot as the action function input.

By ontology or domain independent parameters, it is meant parameters which are not dependent on any information relating to any pre-defined domain.

Parameterising the system state in S405 comprises defining each slot in terms of parameters, which may include converting a slot into ontology-independent parameters and representing a slot in terms of ontology independent parameters. In this step, an appropriate value for a parameter for a specific slot in the belief state is determined, and this may be used as an input, or as part of an input, for the policy model. The belief state-action space is mapped into a feature space that is independent of any domain information. Thus instead of belief states, the policy is configured to receive and operate with a single, or a plurality of ontology-independent parameters.

Parameterising the set of ontology information in S404 comprises defining each slot in terms of parameters, which may include converting a slot into ontology-independent parameters and representing a slot in terms of ontology independent parameters.

The policy model used is domain independent. Although the Q values generated may be generated for a vector corresponding to a domain dependent category, in order to generate the Q values, the category is parameterised. As such, the policy is able to effectively work with a plurality of different domains with different ontologies. As the policy 405 uses domain-independent parameters as inputs to generate the Q values, rather than the ontology-specific slots, the policy is domain independent. This means that the same policy 405 can be used with a plurality of different ontologies. As such, a policy does not need to be optimised specifically for a single pre-defined domain ontology. In other words, a policy optimised for a first ontology can be used with a second ontology, rather than having to optimise a policy specifically for the second ontology.

In general, the ontology-independent parameters may be numerical parameters. A parameter may be a number, vector or distribution. The ontology-independent parameters may be a series, string or matrix of numbers representing certain ontology-independent parameters. An ontology-independent parameter may comprise a definition or equation. Where a parameter is said to be determined by an entity, the entity may be used as an operand to determine a parameter-quantity for inputting into the parameterised policy as an input. It is to be understood that where a parameter is said to be determined by an entity, the entity may not be the only operand or influencing factor in determining the parameter. As such, 'determined by' does not necessarily mean solely determined by. Where it is said that a parameter is determined by an entity, the parameter may be dependent on, proportional to, inversely proportional to or otherwise related to the entity.

A category defined in terms of parameters may comprise a parameter-quantity or a plurality of parameter-quantities. For example, a parameter may be determined by the number of possible values a slot can take, M. The parameter may be an equation using M as an operand. When applied to a slot, M will be used to produce a value; this value may be a parameter-quantity, which may be a number, vector or distribution. The parameterised policy may be configured to operate with a parameter-quantity as its input.

The ontology-independent parameters may be defined to allow slots of one ontology to effectively be compared to slots of a different ontology, via an ontology-independent space. The ontology-independent parameters may be properties of a slot which can be measured, calculated, determined or estimated for a plurality of different slots belonging to a plurality of different ontologies.

A policy configured to operate with ontology-independent parameters may be able to define the behaviour of a SDS based on inputs which are not specific or dependent on the ontology with which it is working. A parameterised policy may be a policy configured to operate on parameters. A parameterised policy may be configured to receive representations of slots and/or belief states, defined in terms of parameters, as inputs to generate a Q value. As such, a specific parameter-value may be determined for an, or each, parameter (and optionally for each slot) and the parameterised policy may be configured to operate with these specific parameter-values.

It is to be understood that while a parameterised policy is configured to operate with an ontology-independent parameter as an input, the parameterised policy may be configured to operate with a plurality of parameters as inputs. A slot of an ontology or a belief state may be defined in terms of a plurality of ontology-independent parameters, respectively.

Using such parameters allows a fixed-size domain-independent space, and policies learned on this space can be used for any domain. The policy model effectively solves generic information-seeking problems. This means, for example, that instead of taking an action "inform(food)" the system takes action functions of the type "inform" and action function inputs of the type "slot with maximum belief and importance greater than X" (where the importance will be described later and is a measure of how likely it is that a slot of the end user ontology must be filled for the parameterised policy to meet a user's requirement) in order to generate a Q value. The Q value may be generated for a vector corresponding to the specific slot. Alternatively, since the system has access to the respective ontologies for each pre-defined domain, it can to map its generated actions from the domain-independent space back to each domain-specific space.

The parameters may be general characteristics of slots in information-seeking dialogues, for example one or more of:
potential impact on the search results when the slot has a value (for example, if in the database there are 33% cheap restaurants, 33% moderately priced and 33% expensive ones, and the slot 'price' has a particular value (e.g. cheap), then effectively the number of relevant items is reduced by ⅔. Other values, e.g. location or food type may have lesser discriminative power. This may influence which slot's value to request sooner in the dialogue for example);
importance: a measure of how likely it is that the slot of the end user ontology must be filled for the parameterised policy to meet a user's requirement, wherein the processor may be configured to determine this importance, or it may be defined by a user, and it may be continuous or binary (optional or required);
priority: a measure of the user's perceived potential impact on the search results, wherein the processor may be configured to determine this priority, or it may be defined by a user, and may be continuous or binary;
descriptive characteristics (e.g. number of allowable values, distribution of those values in the database (DB));
features describing the dialogue (for example the last user act).

For example, an ontology-independent parameter may be determined by the likely position in a dialogue at which the slot will be requested or referenced by a user. An ontology-independent parameter may be proportional to, or inversely proportional to, the entropy of the value distribution for the respective slot. The entropy of the value distribution for the respective slot may be assigned to one of a plural of entropy-range bins to determine the ontology-independent parameter. An ontology-independent parameter may be determined by or related to how each slot is related to completing the underlying task. The data by which an ontology-independent parameter is determined may be the proportion of the values for the slot which, if selected, would result in the number of results being equal to or below a threshold number.

Some further more specific examples of ontology independent parameters are described below, where $V_s$ denotes the set of the values that a slot s can take, and $|V_s|$ is the size of $V_s$. $h=(s_1=v_1 \wedge s_2=v_2 \ldots s_n=v_n)$ is a user goal hypothesis consisting of a set of slot-value pairs. DB(h) denotes the set of candidates in the stored database (DB) satisfying h. The candidates in the DB are items, such as restaurants, with specific values (e.g. name, food type, price, location, etc) that the system presents to the user. In addition, $\lfloor x \rfloor$ is defined as the largest integer less than and equal to x.

One or more of the following quantities can be used for parameterisation:
Number of values
e.g. a continuous parameter, $1/|V_s|$ (where the normalised quantity may be used to make all the parameters have similar value ranges for numerical stability purposes);
e.g. discrete parameters mapping $|V_s|$ into N bins, indexed by $\min\{\lfloor \log_2|V_s| \rfloor, N\}$, for example allocating one of six binary-bins according to $\min\{\text{int}[\log_2(|V_s|)],6\}$, so that a slot where $|V_s|=8$ would be allocated the following parameter: [0,0,1,0,0,0], where "int" refers to a function which finds the nearest integer. This groups slots into categories/bins according to the number of values they can take;
Importance e.g. two parameters describing, respectively, how likely a slot will and will not occur in a dialogue:

e.g. a binary indication of whether the slot must be filled in order to complete the task or satisfactorily meet the user's criteria (0=no, 1=yes);

e.g. a continuous measure of how likely it is that the slot of the end user ontology must be filled for the parameterised policy to meet a user's requirement, wherein the processor may be configured to determine this importance;

Priority e.g. three parameters denoting, respectively, how likely a slot will be the first, the second, and a later attribute to address in a dialogue, e.g. as a scale of $\{1,2,3\}$ mapped to $\{[1,0,0],[0,1,0],[0,0,1]\}$;

e.g. a continuous measure of the user's perceived potential impact on the search results, wherein the processor may be configured to determine this priority;

Value distribution in the stored database DB of values from all of the pre-defined domains:

e.g. where DB(s=v) denotes the set of entities in the database that have the attribute s=v, and |DB(s=v)| and |DB| denotes the size of the above set and the size of the database respectively, the value distribution may be calculated by calculating |DB(s=v)|/|DB| for each possible value v of the slot s to produce a discrete distribution (a normalised histogram), and then the entropy may be computed for this normalised histogram;

Potential contribution to DB search, e.g. given the current top user goal hypothesis h* and a pre-defined threshold $\tau$, How likely filling s will reduce the number of matching DB results to below $\tau$, i.e. $|\{v: v \in V_s, |DB(h^* \wedge s=v)| \leq \tau\}|/|V_s|$ (proportion of the slot's values resulting in obtained results in the database below a threshold number);

How likely filling s will not reduce the number of matching DB records to below $\tau$, i.e. $|\{v: v \in V_s, |DB(h^* \wedge s=v)| > \tau\}|/|V_s|$ (proportion of the slot's values resulting in obtained results in the database above a threshold number)

How likely filling s will result in no matching records found in the DB, i.e. $|\{v: v \in V_s, DB(h^* \wedge s=v) = \emptyset\}|/|V_s|$ (proportion of the slot's values resulting in obtained results in no results in the database meeting the user's criteria);

note that this parameter will only be non-zero for slots whose current top hypothesis in the belief is null, in other words, when the system believes it hasn't observed any constraints for those slots yet.

The policy may be configured to receive a plurality of ontology-independent parameters for each slot in order to generate Q. As such, a slot may be defined in terms of a plurality of ontology-independent parameters. A slot may be defined in terms of 5, 10 or more than 10 ontology-independent parameters. A slot may be defined in terms of all of the above ontology-independent parameters.

There may be a first set of ontology-independent parameters for defining categories in the set of information defined in S404 and a second set of ontology-independent parameters for defining the categories in the reduced system state generated in S405. The first set may be different to the second set or the same. The first and second set may be mutually exclusive.

The parameterisation of the reduced system state in S405 may be described by the function $\psi(b,s)$, which will be described in more detail below.

An ontology-independent parameter for defining a system state may be determined by the maximum probability in the system state (i.e. the probability corresponding to the top hypothesis). An ontology-independent parameter for defining a system state may be determined by the entropy of the distribution. An ontology-independent parameter for defining a system state may be determined by the probability difference between the top two hypotheses (in an example implementation this value may be discretised into 5 bins with interval size 0.2). An ontology-independent parameter for defining a system state may be determined by a non-zero rate, e.g. proportion of the elements in the system state that have non-zero probabilities.

A specific example for parameterising a belief state in a POMDP based system is described below.

A belief state is generally domain-dependent, i.e. the belief state generated in S405 comprises a marginal (i.e. slot-wise) belief for each relevant slot (it may also comprise other domain independent information e.g. dialogue history). As described previously, a full belief state b can be represented in three parts: the joint belief $b_{joint}$, a set of slot-wise beliefs $\{b_s\}$ and other beliefs $b_o$ that are for domain-independent factors, such as dialogue history, communication methods, etc. Each b here is a discrete distribution (a non-negative normalised vector). In addition, there may be a set of (one-dimensional) values, each indicating the probability of a slot being requested by a user (e.g. if a user "how much is this laptop?", then the slot "price" is being requested). $br_s$ denotes the belief probabilities for slot s being requested.

$b_o$ is domain-independent and thus is not parameterised in this step.

Given a discrete distribution $\tilde{b}$, regardless of its dimension, a few general ontology-independent parameters can be used to define it. These parameters are applicable to any discrete distributions. The following are example parameters:

(1) The maximum probability in $\tilde{b}$ (i.e. the probability corresponding to the top hypothesis)

(2) The entropy of the distribution (3) The probability difference between the top two hypotheses (in one implementation this value was discretised into 5 bins with interval size 0.2)

(4) Non-zero rate: proportion of the elements in $\tilde{b}$ that have non-zero probabilities The system state parameterising step applies one or more of the above list (1) to (4) of parameterisations to $b_{joint}$, providing a domain-independent parameter vector for the joint belief.

The other domain-dependent components are $b_s$ (and $br_s$). If, when deciding whether to execute an action a, the system only needs to consider the slot s that a depends on (s can be uniquely derived from a) together with the global parameters (the joint belief parameters and other parameters above), and regardless of what is the case for the other slots, then every a will only have the dependence on its uniquely corresponding $b_s$ (and $br_s$). One or more of the above parameterisations (1) to (4) can then be applied to $b_s$ ($br_s$ is just a number, so that number can simply be used as an additional parameter without being parameterised).

The obtained parameters can then be concatenated to the joint belief parameters and the "other" parameters, such that the overall belief state parameterisation is ontology-independent. This can be used an input for the policy in S406.

The "other" parameters that may be included, may include one or more of:

(1) Belief probabilities for four communication methods, "byconstraint", "byname", "byalternatives", "finished"; and (2) Merged confidence scores for the user communication functions observed in the current turn.

For each informable slot s in the reduced belief state, a function $\psi(b,s)$ is used to parameterise the slot. The function for example extracts the probability of the top marginal hypothesis $b_s^{top}$, the entropy of $b_s$, the probability difference between the top two marginal hypotheses (discretised into 5 bins with interval size 0.2) and the non-zero rate ($|\{v: v \in V_s, b_s(v)>0\}|/|V_s|$). In addition, if the slot is requestable, the probability of it being requested by the user is used as an extra parameter. A similar parameterisation procedure (except the "requested" probability) is applied to the joint belief as well, from which the obtained parameters are used for all communication functions. To capture the nature of the underlying task (DB search), two additional parameters are defined for the joint belief, an indicator $[[|DB(b_{joint}^{top})| \leq \tau]]$ and a real-valued parameter $|DB(b_{joint}^{top})|/\tau$ if the former is false, where $\tau$ is the same pre-defined threshold used for slot parameterisation as introduced above. The function $\psi(b,s)$ is used to parameterise the system state during training and implementation.

Optionally, there may be a different $\psi$ functions for different actions, since different aspects of the belief may be important for different actions. For example, the input belief state may be parameterised using a plurality of different parameterisation functions, each corresponding to a different action function. The Q values for each row in each vector are generated using the parameters corresponding to the action function corresponding to the row. There are also a number of other slot-independent parameters included, including the belief over the communication methods and the marginal confidence scores of user dialogue act types (communication functions) in the current turn.

Optionally, since some of the parameters may relate to the full probability distributions, the parameterising is performed on the full belief state.

Unlike methods employed in a belief summariser, the belief parameteriser defines the belief state in terms of ontology-independent parameters. A belief parameteriser according may also convert the full belief state into a low dimensional form, thus reducing the number of dimensions from the full belief state. The output of the belief parameteriser is ontology and domain independent. The belief state, defined in terms of ontology-independent parameters can then be used as an input for the policy model in S406.

An ontology parameteriser defines the slots in the set of information identified in S404 (which may be performed before or during the operation of the policy model) in terms of domain-independent parameters. This may be done separately to the parameterisation of the system state. These domain-independent parameters are not specific to the ontology. The ontology information may be parameterised at each turn in the dialogue (either before or during operation of the policy model), or alternatively some or all of the ontology information may be stored in terms of the parameters. If the domain does not change between turns, the previous generated ontology information may be used.

The set of ontology information defined in S404 comprises action functions and action function inputs. As has been described above, the action function $f_a$ may be e.g. inform, deny, confirm, etc., and the action function input may be null, or a slot for example (e.g. food, pricerange, etc.)

The action functions are already domain independent and therefore are not parameterised in this step. However, some of the action function inputs are domain dependent, and are parameterised in this step.

Each action function input can be parameterised in a domain-general way using a function $\varphi_a()$ for parameterising, where the parameterised action function input is given by:

$\varphi_a(i_a)$

Again, the categories may be parameterised using a plurality of different parameterisation functions, each corresponding to a different action function. The Q value for each row in each vector are then generated using the parameters corresponding to the action function corresponding to the row.

Example functions $\varphi_a()$ for parameterising the stored ontology slots are described below. A large number of ontology-independent parameters can be used to define the slots of the ontology, of which the following are examples:

Number of values
- e.g. a continuous parameter, $1/|V_s|$ (where the normalised quantity may be used to make all the parameters have similar value ranges for numerical stability purposes);
- e.g. discrete parameters mapping $|V_s|$ into N bins, indexed by $\min\{\lfloor \log_2|V_s|\rfloor, N\}$, for example allocating one of six binary-bins according to $\min\{\text{int}[\log_2(|V_s|)],6\}$, so that a slot where $|V_s|=8$ would be allocated the following parameter: [0,0,1,0,0,0];

Importance e.g. two parameters describing, respectively, how likely a slot will and will not occur in a dialogue:
- e.g. a binary indication of whether the slot must be filled in order to complete the task or satisfactorily meet the user's criteria (0=no, 1=yes);
- e.g. a continuous measure of how likely it is that the slot of the end user ontology must be filled for the parameterised policy to meet a user's requirement, wherein the processor may be configured to determine this importance;

Priority
- e.g. three parameters denoting, respectively, how likely a slot will be the first, the second, and a later attribute to address in a dialogue, e.g. as a scale of $\{1,2,3\}$ mapped to $\{[1,0,0],[0,1,0],[0,0,1]\}$;
- e.g. a continuous measure of the user's perceived potential impact on the search results, wherein the processor may be configured to determine this priority;

Value distribution in DB:
- e.g. where DB(s=v) denotes the set of entities in the database that have the attribute s=v, and $|DB(s=v)|$ and $|DB|$ denotes the size of the above set and the size of the database respectively, the value distribution may be calculated by calculating $|DB(s=v)|/|DB|$ for each possible value v of the slot s to produce a discrete distribution (a normalised histogram), and then the entropy may be computed for this normalised histogram;

Potential contribution to DB search, e.g. given the current top user goal hypothesis h* and a pre-defined threshold $\tau$,
- How likely filling s will reduce the number of matching DB results to below $\tau$, i.e. $|\{v: v \in V_s, |DB(h^* \wedge s=v)| \leq \tau\}|/|V_s|$ (proportion of the slot's values resulting in obtained results in the database below a threshold number);

How likely filling s will not reduce the number of matching DB records to below τ, i.e. |{v: v∈V$_s$, |DB(h*∧s=v)|>τ}|/|V$_s$| (proportion of the slot's values resulting in obtained results in the database above a threshold number)

How likely filling s will result in no matching records found in the DB, i.e. |{v: v∈V$_s$, DB(h*∧s=v)=∅}|/|V$_s$| (proportion of the slot's values resulting in obtained results in no results in the database meeting the user's criteria);

note that this parameter will only be non-zero for slots whose current top hypothesis in the belief is null, in other words, when the system believes it hasn't observed any constraints for those slots yet.

Any one, more than one, or none of the above parameters may be used for example.

For example, if the underlying task is to obtain user's constraint on each slot so that the system can conduct a database (DB) search to find suitable candidates (e.g. venues, products, etc.), then the slot parameters may describe the potentiality of the slot to refine the search results (reduce the number of suitable candidates) if this slot is filled. For another example, if the task is to gather necessary and optional information to execute a system command (e.g. setting a reminder or planning a route), where the number of values of each slot can be unbounded, then the slots parameters may indicate whether the slot is required or optional. In addition, the slots may have some specific characteristics causing people to address them differently in a dialogue. For example, when buying a laptop, it is more likely one would talk about the price first than the battery rating. Therefore, parameters describing the priority of each slot are also necessary to yield natural dialogues. An exemplar list of parameters is provided above.

A method for parameterising the set of ontology information identified in S404 may be as follows. A slot of is defined in terms of ontology-independent parameters. This may comprise calculating the above-listed parameters for the slot in question. The ontology-independent parameters may be according to the above list, or may be other ontology-independent parameters. In this way, every slot of the ontology is defined in ontology-independent parameters. Some of the slots are defined in terms of the ontology-independent parameters by calculating a value, as described in the above list of parameters. A different parameterisation function may be used corresponding to each action function, as has been described in respect to the belief state.

The importance and priority parameters described above may be manually assigned binary values.

Alternatively, one or both may be automatically estimated, for example from in-domain human-human example dialogues (e.g. collected from Wizard-of-Oz experiments). The importance and priority values can be learned during the training stage, and may also be updated during implementation. Alternatively, they may be directly learned the parameter values during implementation.

Thus the importance and/or the priority may be determined for the slots of the ontology information for each sub-domain as follows.

For each slot that was mentioned by the user in the dialogue (and that has a value), the cumulative moving average of the ratio of the reward that was achieved to the maximum possible reward is determined as an estimate of slot importance. Thus for each category, a cumulative moving average of the ratio of the performance indicator achieved to the maximum possible performance indicator is determined as an estimate of category importance.

For the same slots, slot priority is determined by calculating a cumulative moving average of the relative position in the dialogue episode (i.e. turn number) when the slot was mentioned by the user.

When learning or updating the values during implementation, the system is able to adapt to potential changes as time progresses.

Specifically, the features are estimated as follows:

$$i_s^t = \frac{r_t + |R_{min}|}{|R_{max}| + |R_{min}|}$$

$$I_s \leftarrow \frac{i_s^t + (N-1)I_s}{N}$$

$$P_s \leftarrow \frac{pos_s^t + (N-1)P_s}{N}$$

Where $I_s$ and $P_s$ are the estimates of importance and priority for slot s, respectively, $r_t$ is the reward at dialogue t, $R_{max}$=max{R(s, a)}, $R_{min}$=min{R(s, a)}, N is the number of times that P or I have been updated, and $pos_s^t$ is the turn number at which slot s was mentioned by the user in dialogue t. N refers to the total number of times importance of a slot (or priority) has been updated over multiple dialogues. The R values are determined by a reward function, which may be manually defined. The reward function may be the reward function used to train the policy model. This function provides a reward r at each turn in the dialogue. $R_{min}$ and $R_{max}$ are the minimum/maximum possible values that function R can assign. In practice, an overall reward value may be determined for the dialogue, and this is then related to slots that were mentioned in the dialogue, giving the rewards for each turn. The maximum and minimum values can be determined through the reward function or the human rating. For example, the reward function may assign a value of 100 for success. This is then the maximum value, with 0 as the minimum value. Alternatively, humans may be asked to rate the dialogue on a scale 0-5, so that 5 is the maximum and 0 the minimum.

After parameterisation, the reduced system state and set of information is then inputted into the policy model in S406, which outputs an action function and an action function input. As described in relation to S206 above, the dialogue policy takes as input the current parameterised system state, and outputs the next domain-independent system action function and input. The input may be domain dependent for example. A subset of the policy model (the Q table) is selected in real time, comprising the Q values $Q(\psi_{DIP}(B_r), \varphi_{DIP}(i_a), f_a)$. These Q values may be generated as a series of vectors, each corresponding to an action function input (each vector being of size $|F_a|$ where there are $|I_a|$ vectors, where $F_a$ is the action function set and $I_a$ is the action function input set defined in S404 for the input belief state). This is used to derive both the next input and action function: $argmax_{s',a}Q[\varphi_{DIP}(i_a), f_a]$, where $i_a \subseteq I_a$, $f_a \subseteq F_a$ and where the Q values are those for the specific input belief state B.

The output from the policy model is a communication function (e.g. "select") and an action function input, which may be a domain dependent action function input. This is then converted from a summary action to a full action by adding the value corresponding to that slot (e.g. Japanese).

S407 corresponds to S207 described above. The action may be in the form of text. The system may comprise a natural language generator (NLG) which converts the text into speech to be output.

Figure 5:
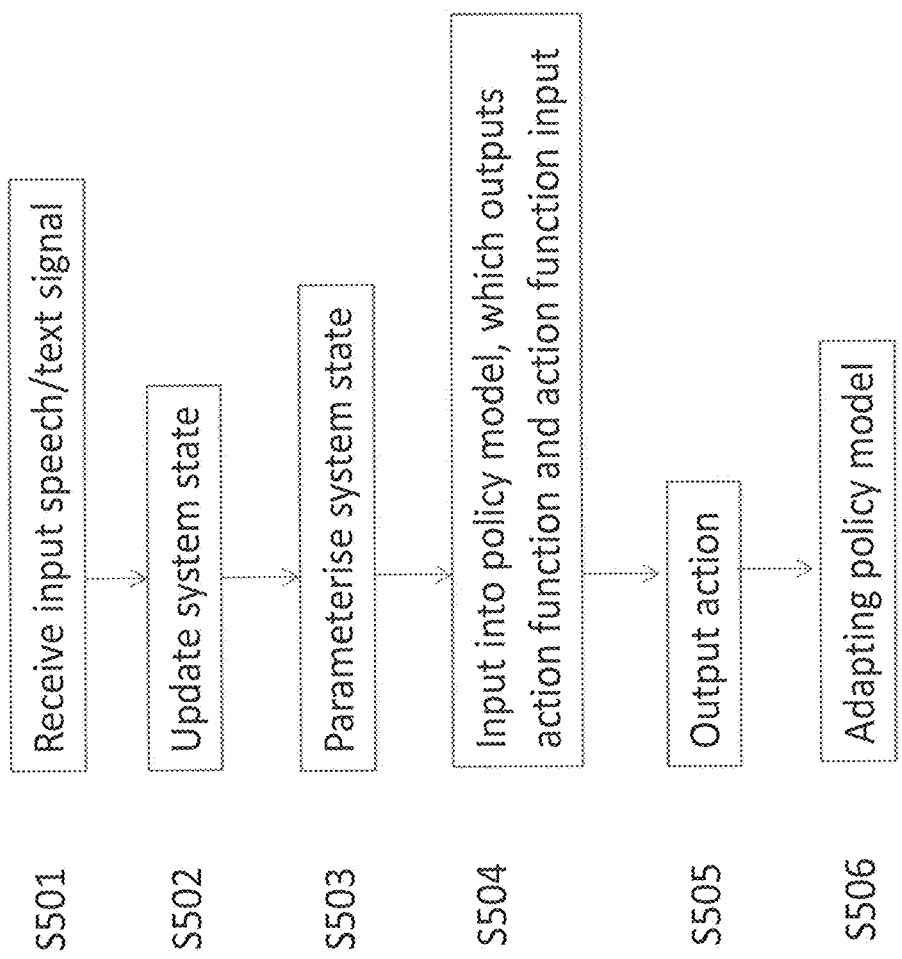
FIG. 5 shows a flow chart of an example method of training a policy model.

FIG. 5 shows a flow chart of an example method of training a policy model. The policy model is trained to map input belief states to output actions. The policy model may be trained with a stored corpus of data, or with a human or simulated user.

An example method is described below, where DIP is used. DIP is a method that maps the (belief) state space into a feature space of size N that is independent of the particular domain:

$$\Phi_{DIP}(B, i_a, f_a): S \times I_a \times A \rightarrow \mathbb{R}^N, s \in S, i_a \in I_a, f_a \in F_a,$$ where $I_a$ is the set of slots and R is the set of real numbers. $\Phi_{DIP}$ therefore extracts features for each slot, given the current belief state, and optionally depends on $F_a$ in order to allow for different parameterisations for different actions.

This allows definition of a fixed-size domain-independent space, and policies learned on this space can be used in various domains, for example in the context of information-seeking dialogues. A single, domain-independent policy model may therefore be learned, that can be applied to e.g. information-seeking dialogues. Recurrent Neural Networks (RNN) can be used to approximate the Q function as described below.

Once a DIP based policy has been optimised in one pre-defined domain using data-driven approaches, the obtained policy (i.e. the learnt model parameters) provides prior knowledge (or mathematically a prior distribution) for the policy in a different domain with a different ontology, providing that the same policy model and same ontology parameterisation are used for the new ontology. Thus the policy model may be trained for a single pre-defined domain for example, but then used in the above described system with a stored ontology comprising information from multiple domains.

The stored ontology comprising information from multiple domains may be referred to as the end user ontology, which may be an ontology with which the dialogue manager is intended to work. However, the parameterised policy may be optimised using a first ontology. The first ontology may be different to the end user ontology, and may be a single pre-defined domain for example. The parameterised policy may be optimised before being used with the end user ontology. The policy may be optimised before it is implemented or deployed with the end user ontology. The parameterised policy uses parameters as inputs and the parameters may be used to define a parameter 'space' where slots of different ontologies may be objectively mapped or compared. As such, a policy optimised for a first ontology may also thereby be optimised for an end user ontology. The end-user ontology may be either the global ontology, comprising multiple pre-defined domains or any single pre-defined domain ontology. Optionally, the identifier can be used to identify the relevant slots and define the domain used as the end-user ontology at each turn.

To optimise the policy for a first ontology, a slot of the first ontology may be defined in terms of at least one of the ontology-independent parameters such that it is suitable for being used as an input to the parameterised policy. Each of the slots of the first ontology may be defined in terms of at least one of the ontology-independent parameters. This may be done in the same manner as described above in relation to the implementation. As described above, some of the ontology information may be stored in terms of the parameters. Some or all of the ontology information may be parameterised for each dialogue turn, either before or during operation of the policy model.

The optimisation process may comprise repeatedly using a policy model to run through a dialogue with a human or a simulated human. In combination with, or in response to the dialogues with a real or simulated human, the policy may be adapted to increase a performance indicator. Dialogue policy optimisation may be aimed at estimating the expected long-term reward for a system action being executed at a system state or belief state, such that the action with maximum expected reward can be selected at each dialogue turn. The policy model may be a deep neural network based policy model for example. Dialogue policy optimisation may be performed using Deep-Q-Networks.

The dialogues may comprise text signals, in which case the method of training will comprise a step of extracting the system states from the data. The system states may be extracted using a stored, already trained tracker model. The tracker model in this example is thus trained prior to the step of training the policy model, and the trained tracker model then used in training the policy model. Similarly, if the data comprises speech signals, the method of training may comprise extracting text signals using a pre-trained spoken language unit and then extracting the system states corresponding to the text signals.

Thus each input signal received in S501 is used to update a system state received in S502 using a state tracker model. Since in this example, the policy model is trained on a single pre-defined domain, the system state only comprises the categories for the pre-defined domain. Previous system states may also be included as has been described previously in relation to the implementation stage described in relation to FIG. 2. Similarly, the system state may be summarised as has been described previously in relation to the implementation stage in FIG. 2.

Each input system state is then parameterised in S503, i.e. each slot is defined in terms of at least one of the ontology-independent parameters such that it is suitable for being used as an input to the parameterised policy. Each of the slots of the first ontology may be defined in terms of at least one of the ontology-independent parameters. This may be done in the same manner as described above in relation to the implementation stage in FIG. 4. The stored ontology information may also be parameterised at each dialogue turn, or some or all of the stored ontology information may be stored in terms of parameters.

Each extracted system state is then inputted into the statistical policy model in S504, which outputs an action function and action function input based on the stored Q values, as has been described in relation to the implementation stage described in FIG. 2. An action is generated and output in S505, again as has been described previously.

In S506, the policy model is adapted. This comprises updating the stored parameters used to determine the Q values based on the performance indicator. Optionally, the policy model parameters are updated every 10 dialogues. However, the updates can be after each dialogue turn, after each dialogue or after many dialogues. Multiple training steps or 'epochs' may be performed at each update. Optionally, the policy model parameters are updated after every 10 dialogues for 1 epoch (i.e. 1 'pass' over the data collected so far).

Optimising a policy may comprise maximising a certain performance indicator for a specific domain and ontology, or increasing a performance indicator over an initial value. Optimisation of a policy may comprise adapting the policy to increase the success rate or the average reward. Optimisation may comprise adapting a policy such that the mean average, or a combination of the above indicators is maximised. The optimisation process may be a function approximation procedure.

An example of an optimisation process is deep Q network (DQN). Another example is the Gaussian Process Temporal Difference (GPTD).

As has been described above, actions in an SDS system may comprise two parts, a communication function a (e.g. inform, deny, confirm, etc.) and an action function input, which may comprise a list of slot-value pairs s, v for example (e.g. food=Chinese, pricerange=expensive, etc.). Where summary actions are used, the action function inputs may be categories only, i.e. there are no values. Dialogue policy optimisation can be solved via Reinforcement Learning (RL), where the goal during learning is to estimate a quantity $Q(B, f_a, i_a)$, for each B, $f_a$ and $i_a$, reflecting the expected cumulative rewards of the system executing action a comprising action function $f_a$ and action function input $i_a$ at belief state B. A reward function assigns a reward r given the current state and action taken. This may be done by determining a reward value R at the end of each dialogue (e.g. from human input) and then determining a reward r for each turn of the dialogue (i.e. corresponding to a state and action taken at that turn) from this final value R for the dialogue, or may be estimated at each turn. Q estimates the expected value of future rewards (accumulated r), given state b and action a. The value of Q may be updated based on the r values using a Q learning update rule.

A function approximation may be used, where it is assumed that $$Q(B, f_a, i_a) \approx f_\theta(\phi(B, f_a, i_a))$$

where $\theta$ is the model parameter to learn, and $\phi(.)$ is the same as $\Phi_{DIP}$ described above, i.e. a parameter function that maps $(B, f_a, i_a)$ to a parameter vector. f is a function with parameters $\theta$. For example, $f(\phi(B, f_a, i_a))=\theta*(\phi(B, f_a, i_a))+z$, where $\theta$ and z are parameters to optimise so that $f(\phi(B, f_a, i_a))=Q((B, f_a, i_a))$. More generally, f is the function that multiplies $\phi$ with the weights $\theta$.

During learning, Q is estimated for each B, $f_a$, $i_a$ combination. Parameters used to generate these values are stored. During learning and implementation, the Q values are generated as has been described above, and the action function $f_a$ and action function input $i_a$ which have the highest Q for the input state B are selected, again, as has been described above. The parameters used to generate Q may continue to be updated during implementation.

To compute $Q(B, f_a, i_a)$, one can either use a summary belief for dimension reduction or apply the full belief if kernel methods are used. In both cases, the action may be a summary action to achieve tractable computations. Summary actions have been described above and simplify the semantic representations that form the master action a, and can be mapped back to the master action based on some pre-defined rules. In this case, the action function inputs $i_a$ do not contain values, only categories.

In this case, the parameterisation function can be written as:

$$\phi(B, f_a, i_a) \triangleq \delta(f_a) \otimes [\varphi_a(i_a) \oplus \psi_a(b, s)]$$

where $\delta$ is the Kronecker delta and $\otimes$ is the tensor product. B comprises a set of individual belief vectors, represented as $\{b_{joint}, b_o\} \cup \{b_s\}_{s \in S}$ where $b_o$ denote the sections of the belief state independent of any slots (e.g. the belief over the communication methods, the dialogue history, etc.) and S stands for the set of (informable) slots defined in the domain ontology, and $$\psi(b, s) \triangleq \psi_1(b_{joint}) \oplus \psi_2(b_o) \oplus \psi_3(b_s)$$

where $\oplus$ stands for the operator to concatenate two vectors. As the mechanism in each $\psi_x$ to parameterise its operand $b_x$ can be domain-independent, the resulting overall parameter vector will be domain-general. Example functions $\psi(b, s)$ for parameterising the belief state have been described above.

Each slot in the stored ontology comprising the input actions $i_a$ is parameterised using $\varphi_a$, which has also been described above.

Optionally, the parameter functions $\varphi_a$ and $\psi_a$ may change with a, such that a different parameterisation can be applied for each a.

Thus each slot in the stored ontology is parameterised using $\varphi_a$ and each slot in the belief state is parameterised using $\psi_a$. Example functions $\varphi_a$ and $\psi_a$ for parameterising the stored ontology information and the system states have been described above.

Policy learning, i.e. optimisation of a policy is to assign the parameters $\theta$ (e.g. a weight vector if linear model is the case). The number of parameters may be equal to the number of dimensions in the input plus one. In this case the number of dimensions is the size of the system state vector B, plus the number of different fa and ia. Using DIP, the number of dimensions is equal to the number of DIP parameters plus the number of action functions. The number of model parameters $\theta$ learned during training may be equal to this number plus one. This is fixed with respect to the number of pre-defined domains.

Where a neural network based policy model is used, the Neural network (NN) that approximates Q determines how to assign parameters to each combination automatically during learning. The NN has one input layer (which receives the combination B, f, i), multiple connected layers afterwards, and a final output layer. Each layer has a number of hidden variables (nodes) and these variables have connections between them (in consecutive layers). Each connection has a weight. These weights are the parameters learned during training. The parameter determines how much a given hidden variable in the current layer influences a given hidden variable in the next layer. DQN based learning thus determines a set of parameters which may be higher than the dimension of the input. This number is fixed with respect to the number of pre-defined domains.

The output of the policy optimisation technique using DIP thus has a different data structure (fewer number model parameters). Once the weights have been learned, the same parameterisation functions $\varphi_a$ and $\psi_a$ are used to parameterize the ontology and the belief states respectively during implementation.

During optimisation, the policy model may interact with a human or simulated user, and receive feedback which allows determination of the weights $\theta_a$. The interactions may comprise dialogues relating to a single pre-defined domain for example. A system state tracker maps the input utterances to system states, which are then converted to ontology independent parameters using the function $\psi(B)$. The stored ontology, comprising action functions and action function inputs is also converted to ontology independent parameters using the function $\varphi_a(i_a)$. The policy model outputs a communication function and an action function input. A subset of the policy model (the Q table) is selected in real time, comprising the Q values $Q(\varphi_{DIP}(B_r), \varphi_a(i_a), f_a)$. This is used to derive both the next input and action function, i.e. by selecting those with the highest Q values. A full action can then be generated by including the top belief for the slot for the current belief state in the action function input. The feedback regarding the success of the dialogue is used to update the weights $\theta_a$ associated with the action functions, and used to generate Q.

Thus a generic action space $\mathcal{A}$ is defined, comprising the action functions $f_a$, which may be the set of action functions for information seeking problems for example. The generic action space may comprise the following system actions: hello, bye, inform, confirm, select, request, request more, repeat.

The policy thus operates on the $\Phi_{DIP} \times \mathcal{A}$ space, instead of a belief—action space. $\Phi_{DIP}$ achieves domain independence with respect to the slots. By operating in the $\mathcal{A}$ space and letting the policy decide which action to take next as well as which slot the action refers to, independence in terms of actions is achieved.

Actions of any domain are represented as functions of $\mathcal{A} \times I_a$, where $I_a$ are the domain's slots.

The parameters used to generate the Q values are learned during training. The learnt policy then decides which action to take during implementation by maximising over both the action and the slots:

$$f_{at+1} = \text{argmax}_{i_a, f_a} \{Q[\Phi_{DIP}(B_t, i_a, f_a), f_a]\}$$

where $B_t$ is the belief state at time t, $f_a \in \mathcal{A}$.

To approximate the Q function, 4 stacked RNNs with 64 hidden LSTM cells each may be used for example. The input layer receives the DIP feature vector $\Phi_{DIP}(B_t, i_a, f_a)$ and the output layer is of size $\mathcal{A}$. Each output dimension can be interpreted as $Q[\Phi_{DIP}(B, i_a, f_a), f_a]$:

$$\vec{Q}(\Phi_{DIP}(B_t, i_a, f_a)) \approx \text{softmax}(W_k^M x_k^{M-1} + b^M)$$

where $\vec{Q}(\Phi_{DIP}(B_t, f_a))$ is a vector of size $|\mathcal{A}|$, $W^m$ are the weights of the mth layer (out of M layers in total) for cells k, $x^m_k$ holds the activations of the mth layer, where $x^0 = \Phi_{DIP}(B_t, i_a, f_a)$, and $b^m$ are the biases of the mth layer. Optionally, M=4. The neural network thus generates values for each action function $f_a$ for a given parameterised input $i_a$ and parameterised belief state B, and outputs the action function corresponding to the maximum Q value. The policy model uses those values to update the action function and action function input corresponding to the maximum Q value, and iterates over all possible inputs (slots) to determine the action function and input corresponding to the overall maximum Q, and outputs both input and action function corresponding to this value. To generate the summary system action, the selected slot and action are combined. The model may be trained with DQN with experience replay, normalising the input vector of each minibatch to ensure that it follows the same distribution over time. DQN is a type of reinforcement learning. Other policy learning algorithms can be used in place of DQN.

Figure 6:
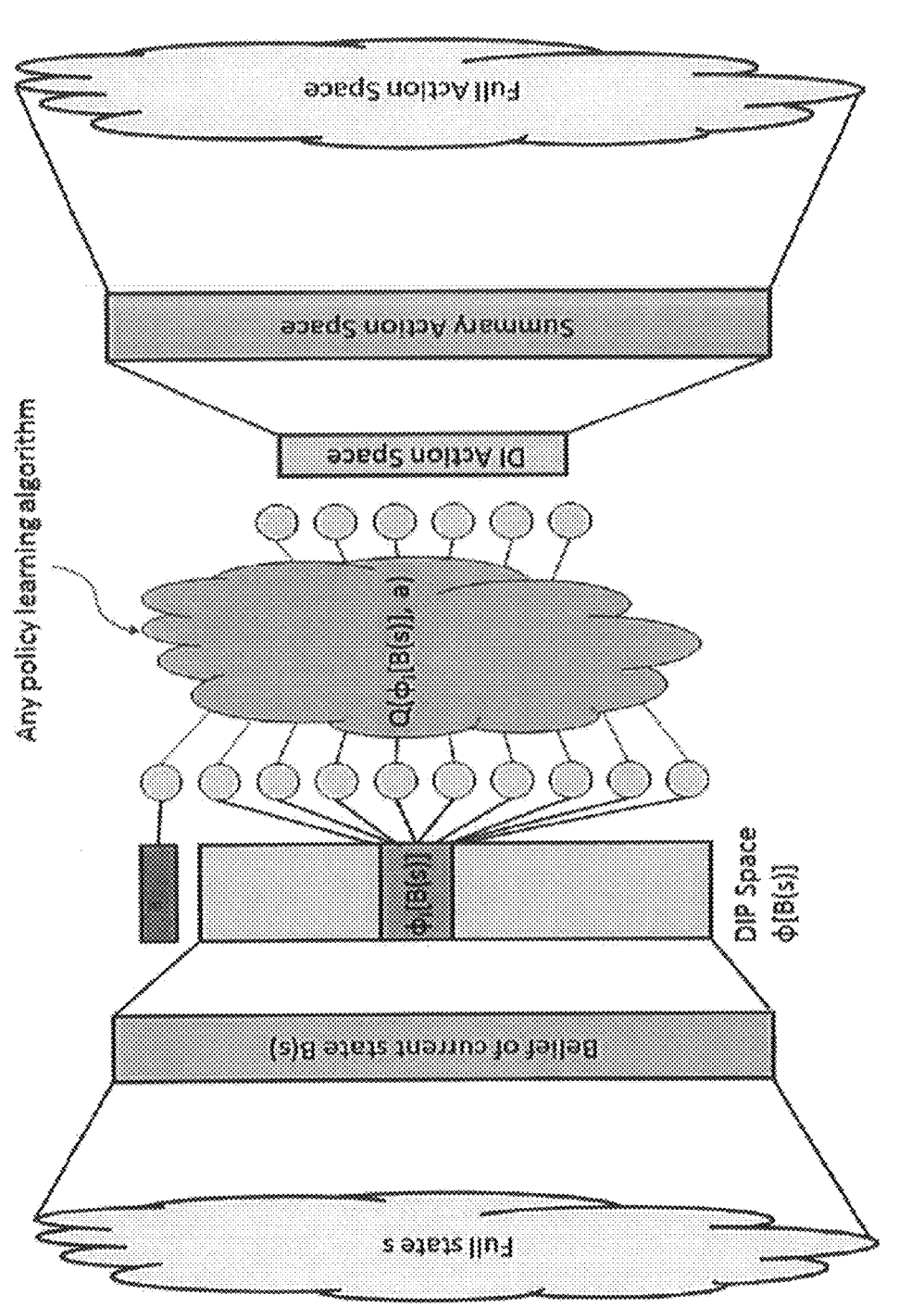
FIG. 6 is a schematic illustration of a method of training a dialogue policy model.

FIG. 6 is a schematic illustration of a method of optimising a dialogue policy. It shows an example dialogue policy learning method when using neural networks, for example deep neural networks. Different layers show the example state and action abstraction. The method focuses on the parts between the belief state and summary-action state, which are performed automatically.

The dialogue policy learning algorithm takes as input the current state, which may include e.g. the previous system action and any other features, and outputs the next domain-independent system action function. However, instead of maximizing Q(B, a) (which is a vector of size |A|, where A is the action set, since B, the belief state is given), the method creates a part of Q in real time: Q(B, $f_a$, $i_a$), as described above. Therefore, by finding the input and action function that maximize: Q(B, $f_a$, $i_a$), the method effectively selects both the appropriate input (e.g. slot) and next action. The output action is then generated as a combination of these.

The method trains a model from data, which is independent of the number and size of the domain the system operates on, in other words, it may train on one domain but then be implemented for a multi-domain system. Alternatively it may be trained by running through dialogues with a human or simulated user. The same policy model can be applied to new domains without the need of any processing. Moreover, the model does not grow as the number of domains or size of domains grows and is therefore scalable and efficient to use in large multi- or single-domain systems. This is achieved by simultaneously selecting the next action and slot to use.

The full state space is mapped to a belief state for the current turn using a state tracker model. The belief state is then parameterised using DIP, to give the parameterised belief state $\Phi_i[B(s)]$, where $\Phi$ is the parameterisation function used to parameterise the belief state (e.g. $\psi$ described above). The belief state may include the previous system action as shown for example. This is then inputted into the policy learning algorithm, which may be any policy learning algorithm.

Instead of the full action space, the system operates on the summary action space. Summary actions may be defined by the following rules:

(1) if an action only takes one slot-value pair as its operand, the actual value is eliminated and the action is summarised to a(s=<current/top value hypothesis in slot s>); and (2) if an action takes a list of slot values as its operand, it is summarised as a(s1=<current/top/joint slot-value hypothesis in s1>, s2=<current/top/joint slot-value hypothesis in s2>, . . . ).

In other words, the current system state (if deterministic states are used, i.e. in MDP-SDS) or the top belief (if belief states are used, i.e. POMDP-SDS) hypothesis is substituted into the < > for each action. The slot information can then be removed from the actions, meaning that each action comprising a domain independent action function $f_a$ and an action function input which may be null or may be one or more categories.

The summary actions are then mapped to domain independent action space, which comprises only action function $f_a$. Since the categories are comprised in the system state, in this case the set of information does not include the categories, and these are retrieved from the input system state.

The policy model takes as input the domain independent action functions and the parameterised domain independent belief state. It maps the domain independent belief state to a domain independent action function and slot. The action function and slot corresponding to the maximum Q value for the belief state are selected as the output. This is done by inputting the parameter values corresponding to one slot (action function input) and the belief state into a neural network, which generates a Q value for each action function and outputs the action function corresponding to the maximum Q values according to:

$$f_{at+1} = \text{argmax}_{i_a, f_a} \{Q[\Phi_{DIP}(B_t, i_a, f_a), f_a]\}$$

The policy model runs the neural network for each slot, and in this manner finds the slot and action function combination corresponding to the maximum Q value.

The neural network parameters used to generate the Q values are updated based on the performance indicator.

Figure 7:
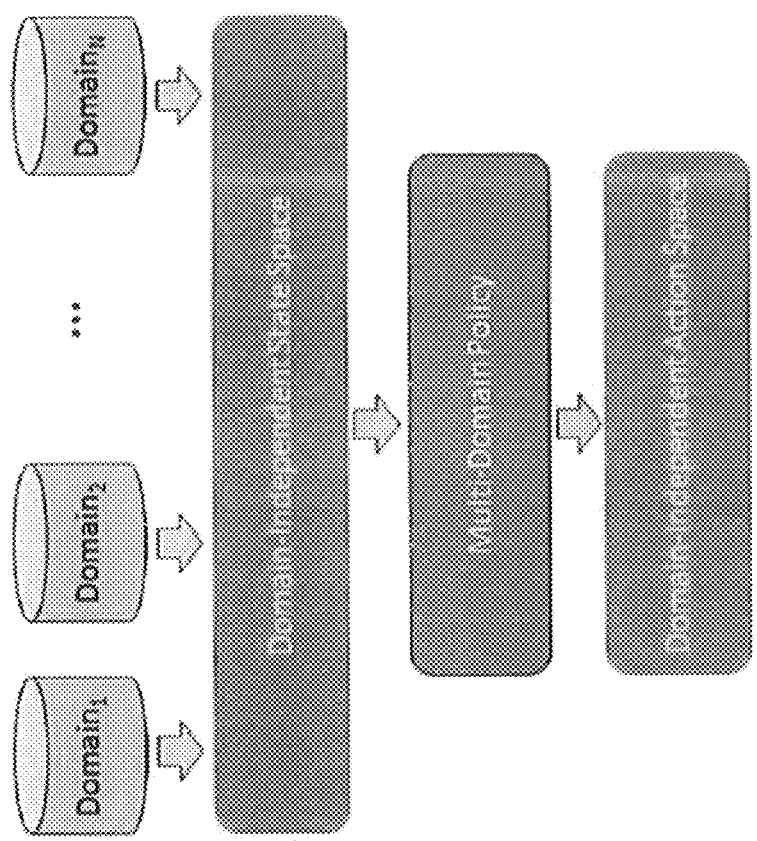
FIG. 7 is a schematic illustration of the system architecture.

FIG. 7 is a schematic illustration of the system architecture. Multiple pre-defined domains are combined to generate a single multi-domain system state, the relevant part of which is inputted to the policy. The output of the policy is a domain independent action space.

Figure 8:
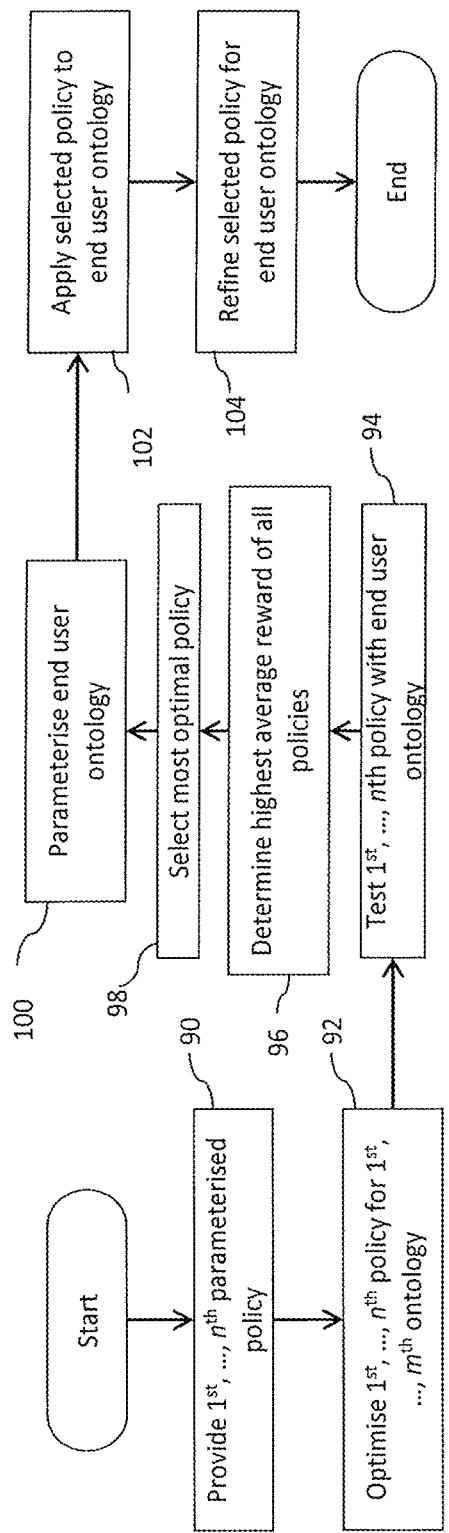
FIG. 8 shows an example method for training a parameterised policy.

FIG. 8 shows an example method for optimising a parameterised policy for a specific ontology to increase at least one of the success rate or average reward over a value for an unadapted policy. An unadapted policy is one that has not been optimised (i.e. has not been through an optimisation procedure). Alternatively, the policy may be optimised such that the action with maximum expected reward can be selected at each dialogue turn, an action being a choice made by a dialogue manager as to what to do at a certain point. The adaptation is usually done in response to and combination with repetitive use of the policy either with a human user or a computer simulating a human user. The method described in relation to FIG. 8 uses Gaussian Process Temporal Difference (GPTD) learning to optimise the parameterised policy, also known as GP-SARSA.

The parameterised policy of FIG. 8 is optimised for a specific ontology. This ontology is not necessarily the ontology with which the policy will eventually be used.

In order for the ontology with which the policy is to optimised to be used with the ontology-independent policy, each slot of the ontology is defined in terms of ontology-independent parameters as described above. This may be done at each dialogue turn, or some or all of the information may be parameterised initially and stored in terms of the parameters for use during training. Once the slots have been defined in terms of ontology-independent parameters, the ontology can be used with the policy in order to optimise the policy.

n different parameterised policies are provided initially in step 90. The parameterised policies are configured to receive ontology-independent parameters as inputs. The parameterised policies at this stage have not been optimised.

Each of the parameterised policies (1 to n) are then optimised in step 92. The policies may be optimised using GP-SARSA for example. The policies may all be optimised by, or with respect to, the same domain with the same ontology, or by different domains with different ontologies. As the policies are domain-independent, it does not matter if the ontology with which the policy is to be used (the "end user" ontology) is different from that for which it was optimised. In order to be used to optimise the ontology-independent policies, each of the m ontologies must have each of their slots defined in terms of ontology-independent parameters before the optimisation can be undertaken. The parameters may be those discussed above.

Once each ontology is suitable for use with the respective policy it is to optimise, each of the optimised policies is used with the end user ontology 94 (the ontology with which the policy is eventually to be implemented). The 'most optimal' policy for the end user ontology is then determined 96. For example, the most optimal policy here is that with the highest average reward. Alternatively, the most optimal policy may be that with the highest task success rate, or average of the two values. The most optimal policy is then selected 98 to be used with the end user ontology. The end-user ontology may be either the global ontology, comprising multiple pre-defined domains or any single pre-defined domain ontology. Optionally, the identifier can be used to identify the relevant slots and define the domain used as the end-user ontology at each turn In order to use the parameterised policy with the end user ontology, the end user ontology is parameterised 100. This can be done as described above, for each turn or initially. Once the end user ontology has been parameterised, the policy is applied to the end user ontology 102. Optionally, the policy applied to the end user ontology is then refined in 104. The process for refining the selected policy in FIG. 8 is the same process as that used to optimise the policy. Naturally, in order to refine the selected policy it is repetitively used with the end user ontology, rather than a further, unrelated ontology. As the policy applied to the end user ontology has already been optimised, the policy at the start of the refining process 104 is an optimised policy. As such, a comparatively small amount of adaptation is required when compared to that for the optimisation process.

Figure 9:
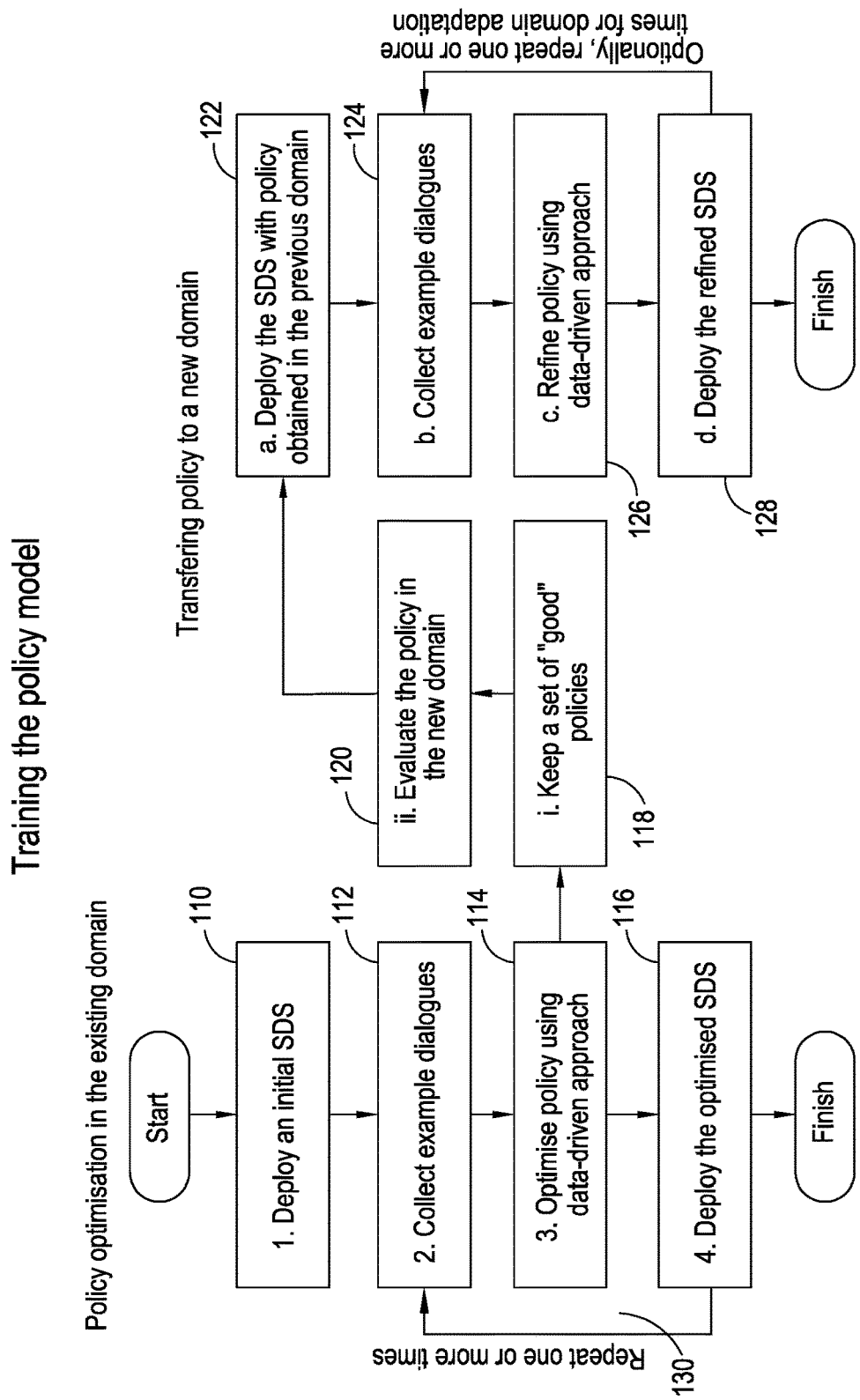
FIG. 9 schematically illustrates a further method for training a policy in a first domain with a first ontology and transferring the policy to an end user domain with an end user ontology.

FIG. 9 schematically illustrates a further method for optimising a policy in a first domain with a first ontology and transferring the policy to an end user domain with an end user ontology. An initial SDS is deployed 110 with an ontology-independent policy. This policy is deployed in a first domain with a first ontology. The slots of the first ontology are defined in ontology-independent parameters so they can be used with the policy. Example dialogues are collected 112 and the policy is optimised 114 as discussed above. The optimised policy can then be deployed 116 as part of an SDS in the domain with the first ontology. Once deployed, an iteration loop 130 may collect further example dialogues 112 to optimise the policy further 114.

Once the policy has been optimised, it may be kept as part of a set of "good" policy or policies 118. The good policy or policies can then be implemented in a new domain with an end user ontology and their performance evaluated 120. If there are multiple "good" policies, the most optimal for the end user ontology can be selected. The selected policy, or the only "good" policy is then deployed with the end user ontology 122. Optionally, further example dialogues may be collected in 124 and the policy further refined in 126 using a data driven approach.

The refined SDS is then deployed in 128.

In general, dialogue policy optimisation is aimed at estimating the expected long-term reward for a system action a being executed at a system state (in MDP-SDS) or a belief state (in POMDP-SDS), such that the action with maximum expected reward can selected at each dialogue turn.

Once the policy model has been trained, it can be implemented in an SDS with the trained state tracker model, identifier model, and any other further models needed, for example text to speech models, automatic speech recognition models, natural language generation models etc.

During implementation, the relevant categories are identified in S203 for example. As has been described previously, this may be done by identifying pre-defined domains using a topic tracker model. Alternatively, relevant categories from across the domains may be identified using a trained identifier model. The identifier model may be trained as described below, in relation to FIG. 10.

Figure 10:
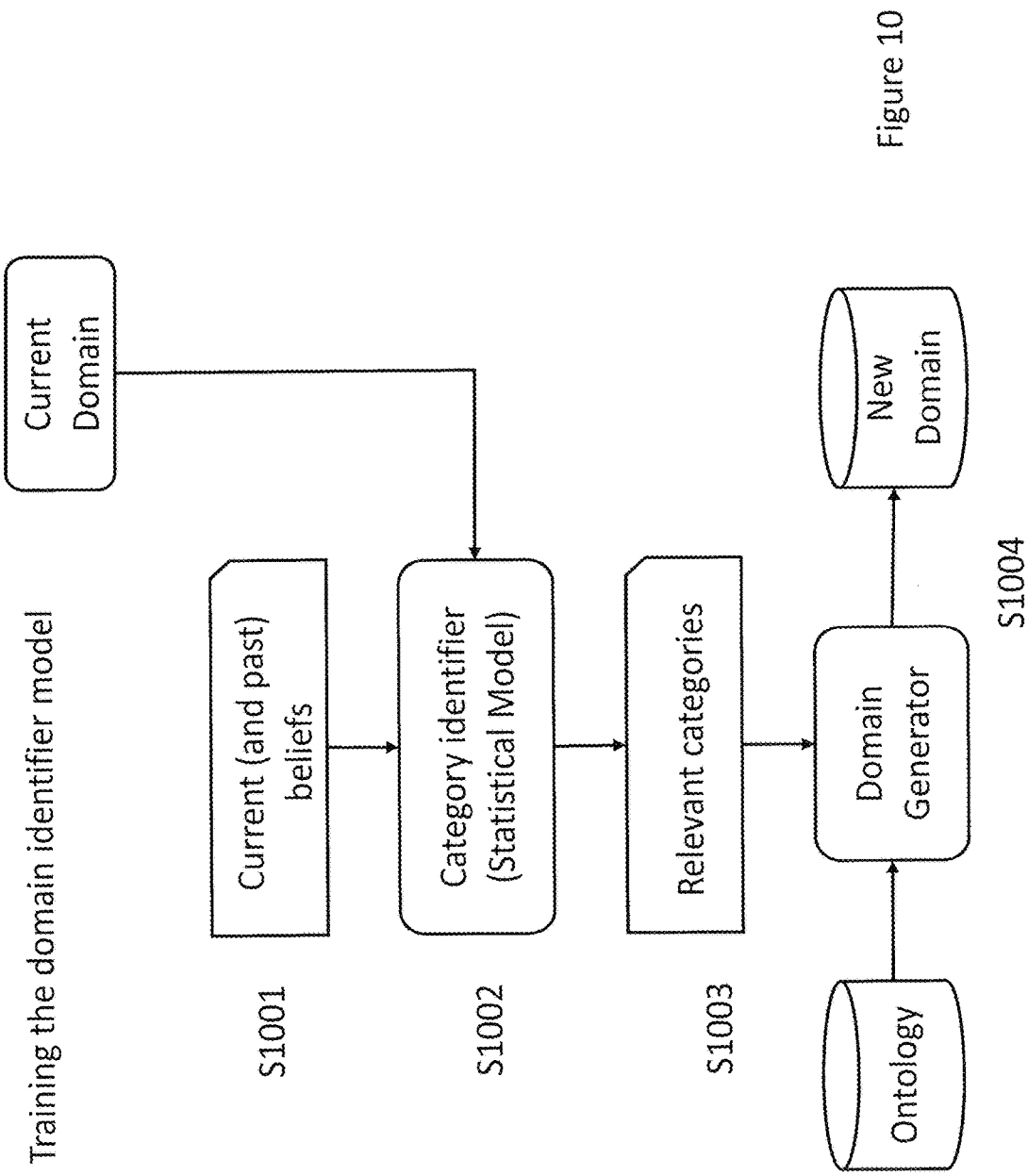
FIG. 10 shows a flow chart of an example method of training an identifier model.

FIG. 10 shows a flow chart of an example method of training an identifier model. In this method it is trained separately to the policy model.

In S1001, system states are obtained for a plurality of dialogues. The system states used in this example are belief states.

A training corpus, comprising a plurality of dialogues is used to train the identifier model. The corpus is a labelled training data corpus for example. The model takes the system state corresponding to each utterance from each dialogue in turn as input.

This corpus may comprise a plurality of system states which correspond to utterances in a dialogue for example.

The corpus is a labelled training data corpus for example. The model takes the system state corresponding to each utterance from each dialogue in turn as input.

This corpus may comprise a plurality of system states which correspond to utterances in a dialogue for example Alternatively, the corpus may comprise text signals corresponding to utterances in a dialogue, in which case the method of training will comprise a step of extracting the system states from the data. The system states are extracted using a stored, already trained tracker model or tracker models. The tracker model in this example is thus trained prior to the step of training the identifier model, and the trained tracker model then used in training the identifier model. A tracker may be trained for each specific pre-defined domain. Alternatively, a generic belief tracker may be trained. This would then need to be re-trained every time a pre-defined domain is added or removed. An example tracker model that may be used is described in "Word-based dialog state tracking with recurrent neural networks", Henderson, Thomson, Young, SIGDial 2014.

Similarly, if the corpus comprises speech signals, the method of training comprises extracting text signals using a pre-trained spoken language unit and then extracting the system states corresponding to the text signals.

The labels may identify the relevant pre-defined domain for each utterance in the dialogue. However, the model is able to generalise beyond the pre-defined domains that are used in training. The identifier model only sees examples from pre-defined domains, but it can generalise to new domains by learning the correlations between input and relevant slots.

Each system state is input into the statistical model in sequence in S1002. Previous system states may also be included in each input to the identifier model as has been described previously in relation to the implementation stage. Similarly, only the value with the highest probability for each category may be included in the input system state, as has been described previously in relation to the implementation stage.

The model then identifies a plurality of relevant categories from the input system state and in S1003, the relevant slots are output. A sub-domain is then generated based on these categories in S1004. This is done in the same manner as described during the implementation stage. This process is repeated for each dialogue turn.

The labels indicating the current domain are used to determine the success of this identification, allowing the model to learn. The statistical model thus receives the buffer as input and the current pre-defined domain as ground truth and learns to map the beliefs to relevant slots.

Thus data-driven methods are used to train a model that can identify at each dialogue turn which parts of this collective knowledge are relevant for the dialogue to progress.

The above description relates to a method of training the various models separately. However, it is also possible to train the policy model together with one or more of the other models. For example, the policy model may be trained together with the identifier model or the topic tracker model. For example, a deep neural net policy model can be jointly optimised with an identifier model. In this case, instead of using labelled data to train the identifier model, some kind of feedback as described above in relation to the policy model is also used to train the identifier model. The system state tracker model may also be trained together with the policy model for example.

Optionally, this is done by using a DNN and jointly optimising the models. Training these models may comprise adapting the models to increase the success rate or the average reward, for example it may comprise adapting the models such that the mean average, or a combination of the above indicators is maximised. The models receive feedback about the quality of the dialogue, and use it to assess the selection of system states, relevant slots and actions. Over time, the models learn to make good predictions, that lead to better feedback/quality measures.

The models may be trained with a stored corpus of data, or with a human or simulated user.

A DQN policy learning algorithm may be used. This algorithm is scalable.

An extended feature set can be used to parameterise the inputs to the policy model, for example importance and/or priority can be estimated in real time during training of the policy model as has been described above.

Figure 11A:
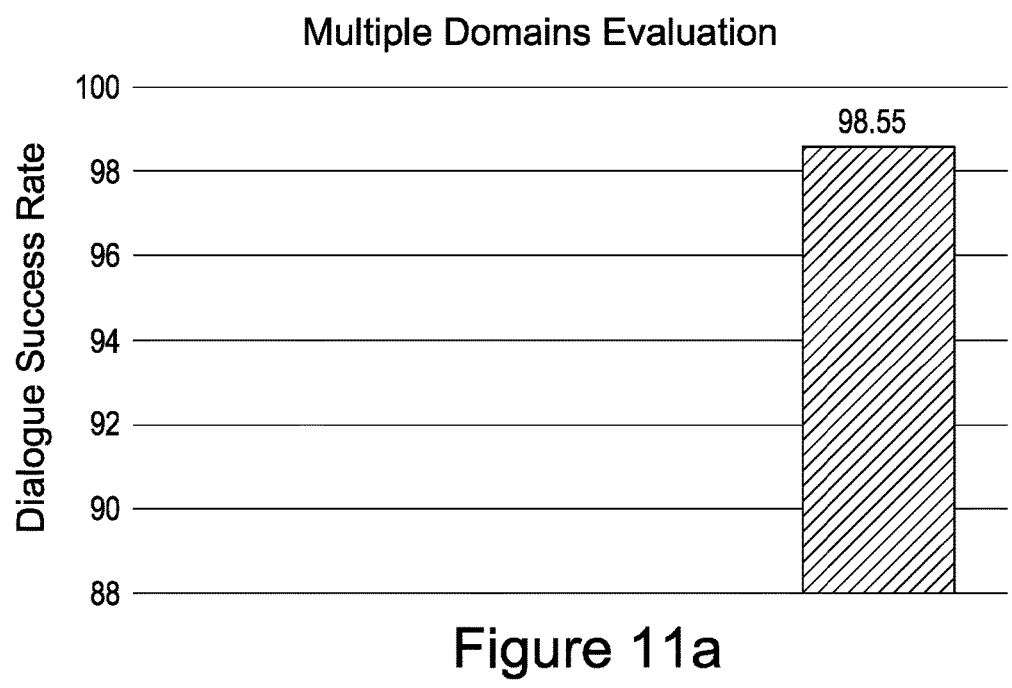
FIGS. 11(a) and (b) show evaluation results for the spoken dialogue method.
Figure 11B:
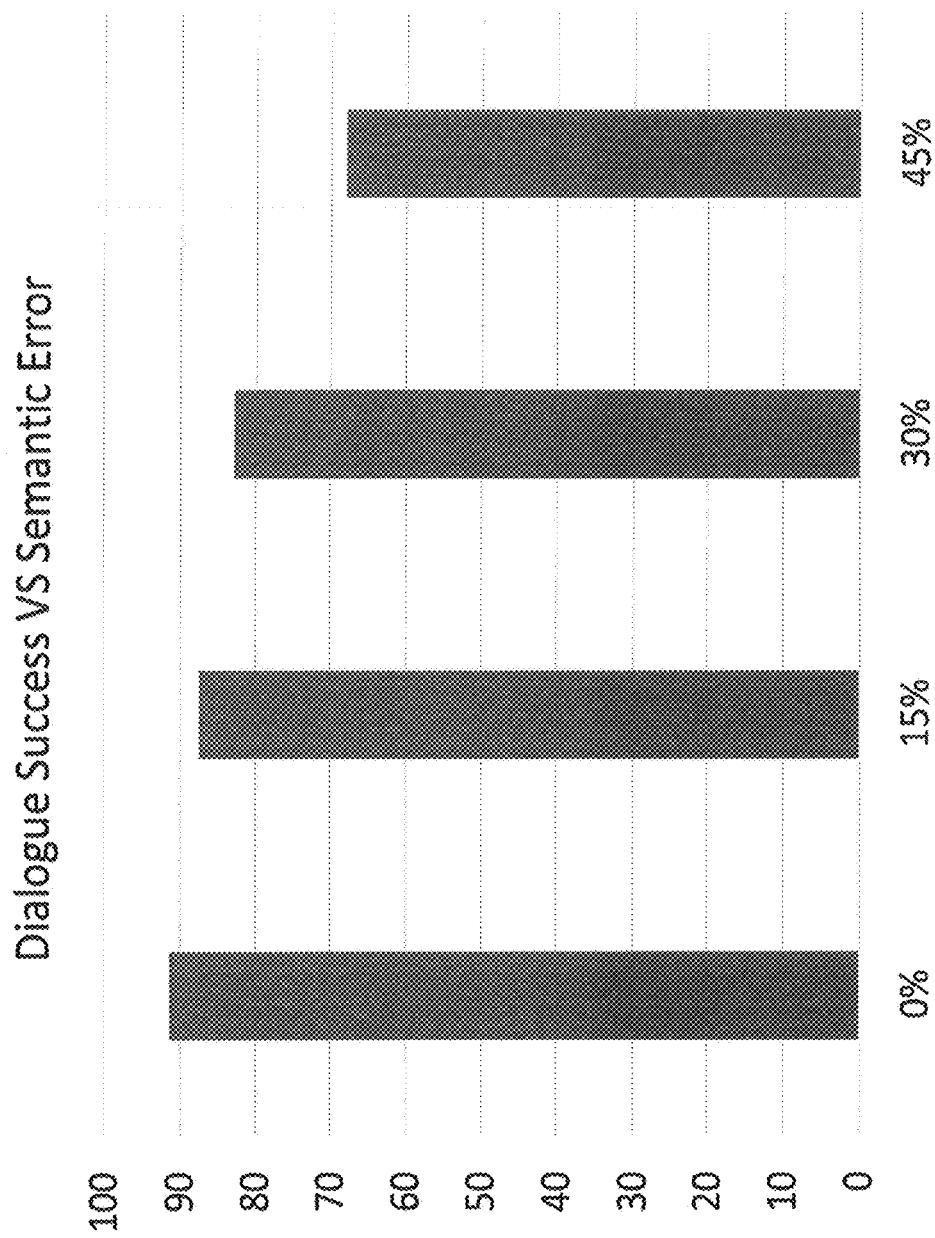

FIGS. 11(a) and (b) show evaluation results on multiple domains (20,000 training episodes) for the method described in relation to FIG. 4 above. Applying the method on multiple domains obtains a 98.55 dialogue success rate.

A system was also trained with a simulated user, and tested on a small human user trial. The DM was trained in simulation on four domains: Cambridge Attractions (CA), Cambridge Shops (CS), Cambridge Hotels (CH), and Cambridge Restaurants (CR). There were 2,000 training episodes and 1,000 evaluation episodes while varying the semantic error rate. Table 1 shows the results of the experiments in simulation, the semantic error rate was varied, averaged over 10 training/testing runs. A single-policy DQN-based manager was evaluated.

|       | DQN-DIP |       |       |       |
| ----- | ------- | ----- | ----- | ----- |
| Error | 0%      | 15%   | 30%   | 45%   |
| CA    | 95.65   | 94.2  | 88.41 | 79.17 |
| CS    | 95.45   | 92.96 | 90.48 | 76.47 |
| CH    | 81.25   | 71.62 | 64.47 | 45    |
| CR    | 92.86   | 90.62 | 87.88 | 71.23 |
| AVG   | 91.30   | 87.35 | 82.81 | 67.97 |

The above described methods enable the development of scalable single- or multi-domain SDS while also supporting domain transfer, and therefore may allow reduced development time and effort to deploy a multi-domain SDS as well as time and effort needed to maintain and extend it.

The above described methods allow training of multi-domain dialogue managers using DNNs. A single, domain-independent policy network may be trained that can be applied to information-seeking dialogues. This may be achieved through DIP and DNNs trained with DQN.

The above described methods provide independence from domain-specific actions, for the dialogue manager.

Multi-domain dialogue managers are trained, using data from multiple (potentially very different) pre-defined domains. The method is scalable to large domains (single or multiple) as the policy's size does not depend on the size of the state or action spaces.

The method may be a Deep Learning approach to dialogue management for multiple domains. A single domain-independent policy network is trained that is applicable to multiple information-seeking domains. A Deep Q-Network algorithm may be used to train the dialogue policy.

While certain arrangements have been described, these arrangements have been presented by way of example only, and are not intended to limit the scope of the inventions. Indeed the methods and systems described herein may be embodied in a variety of other forms; furthermore, various omissions, substitutions and changes in the form of methods and apparatus described herein may be made.

The invention claimed is:

1. A method of adapting a dialogue system, by using the system repeatedly to run through dialogues with a human or a simulated human and providing a performance indicator for each dialogue, and wherein the method further comprises:
receiving data relating to a speech or text signal in a dialogue;
updating a system state based on the input data using a state tracker model, wherein the system state comprises probability values associated with each of a plurality of possible values for each of a plurality of categories, wherein a category corresponds to a subject that the speech or text signal may relate to and can take on one or more values from a set of values;
determining an action function and determining an action function input by inputting information generated using the system state and a set of stored information into a policy model, the set of stored information comprising a plurality of action functions;
outputting information specified by the determined action function and the determined action function input at the output;
adapting the policy model to increase the performance indicator; and
for each category present in the dialogues, determining a cumulative moving average of the ratio of the performance indicator achieved to the maximum possible performance indicator as an estimate of category importance, wherein the importance is used as one of a second set of parameters.

2. The method according to claim 1, wherein the inputted information generated using the system state or the set of stored information comprises a set of possible action function inputs, and wherein determining an action function and determining an action function input comprises:
for each possible action function input generating a vector of values, wherein each value in each vector corresponds to an action function and is an estimate of the dialogue performance if the action function and action function input are used to generate the output information, the values being generated from stored parameters;
wherein the determined action function and action function input corresponds to the action function corresponding to the highest value from all of the vectors; and
wherein adapting the policy model comprises updating the stored parameters based on the performance indicator.

3. The method according to claim 1, wherein the inputted information generated using the system state or the set of stored information comprises a set of possible action function inputs, wherein the action function inputs comprise categories, and further comprising:
identifying one or more relevant categories;
wherein the system state is a reduced system state, comprising the probability values associated with one or more of the plurality of possible values for each of the relevant categories.

4. The method according to claim 3, wherein the one or more relevant categories are identified based on at least part of an input system state information using an identifier model.

5. A method of adapting a dialogue system, by using the system repeatedly to run through dialogues with a human or a simulated human and providing a performance indicator for each dialogue, and wherein the method further comprises:
receiving data relating to a speech or text signal in a dialogue;
updating a system state based on the input data using a state tracker model, wherein the system state comprises probability values associated with each of a plurality of possible values for each of a plurality of categories, wherein a category corresponds to a subject that the speech or text signal may relate to and can take on one or more values from a set of values;
determining an action function and determining an action function input by inputting information generated using the system state and a set of stored information into a policy model, the set of stored information comprising a plurality of action functions;
outputting information specified by the determined action function and the determined action function input at the output;
adapting the policy model to increase the performance indicator; and
for each category in the dialogues, determining a cumulative moving average of the relative position in the dialogue as an estimate of category priority, wherein the priority is used as one of a second set of parameters.

* * * * *